TAPE FEED MECHANISM

Original Filed May 28, 1952 13 Sheets-Sheet 1

INVENTORS
JAMES A. WEIDENHAMMER
WALTER S. BUSLIK
BY Robert S. Dunham
ATTORNEY

Oct. 9, 1962 J. A. WEIDENHAMMER ET AL 3,057,568

TAPE FEED MECHANISM

Original Filed May 28, 1952 13 Sheets-Sheet 2

INVENTORS
JAMES A. WEIDENHAMMER
WALTER S. BUSLIK
BY Robert S. Dunham
ATTORNEY

TAPE FEED MECHANISM

Original Filed May 28, 1952 13 Sheets-Sheet 3

INVENTORS
JAMES A. WEIDENHAMMER
WALTER S. BUSLIK
BY Robert S. Dunham
ATTORNEY

Oct. 9, 1962 J. A. WEIDENHAMMER ET AL 3,057,568

TAPE FEED MECHANISM

Original Filed May 28, 1952 13 Sheets-Sheet 4

INVENTORS
JAMES A. WEIDENHAMMER
WALTER S. BUSLIK
BY Robert S. Dunham
ATTORNEY

INVENTORS
JAMES A. WEIDENHAMMER
WALTER S. BUSLIK
BY Robert S. Dunham
ATTORNEY

INVENTORS
JAMES A. WEIDENHAMMER
WALTER S. BUSLIK
BY Robert S. Dunham
ATTORNEY

INVENTORS
JAMES A. WEIDENHAMMER
WALTER S. BUSLIK
BY Robert S. Dunham
ATTORNEY

TAPE FEED MECHANISM

Original Filed May 28, 1952 13 Sheets-Sheet 8

INVENTORS
JAMES A. WEIDENHAMMER
WALTER S. BUSLIK
BY Robert S. Dunham
ATTORNEY

INVENTORS
JAMES A. WEIDENHAMMER
WALTER S. BUSLIK
BY Robert S. Dunham
ATTORNEY

TAPE FEED MECHANISM
Original Filed May 28, 1952 13 Sheets-Sheet 10
FIG. 21
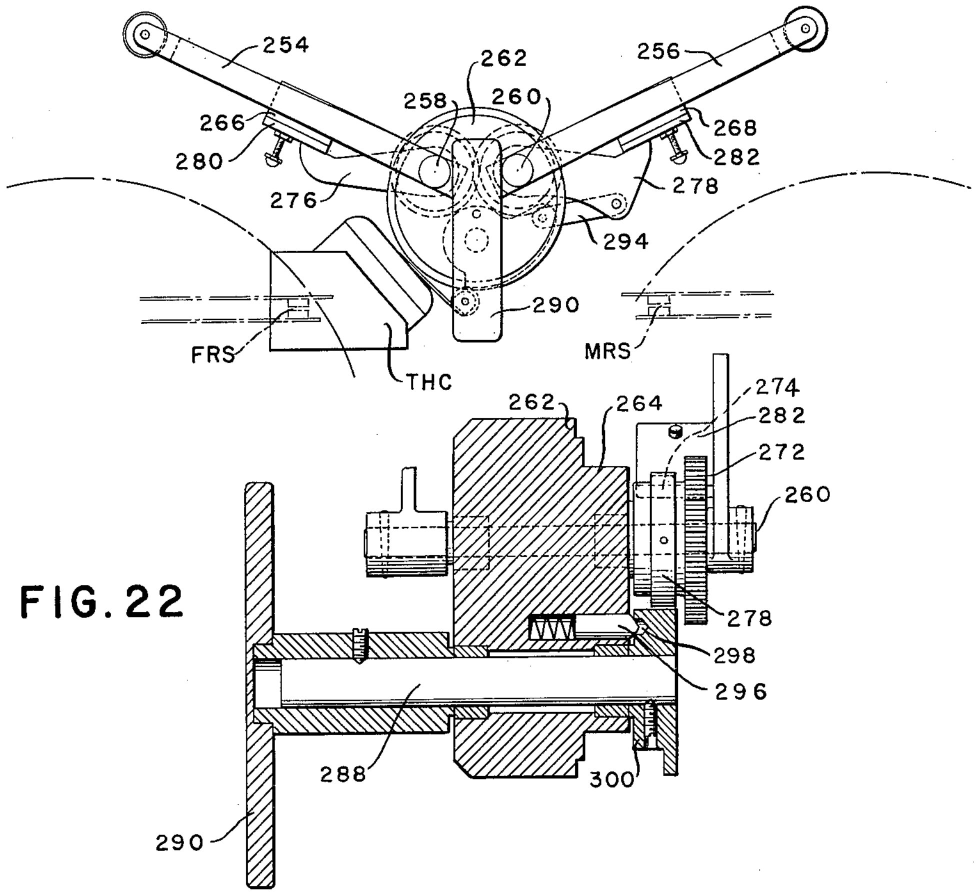
FIG. 22
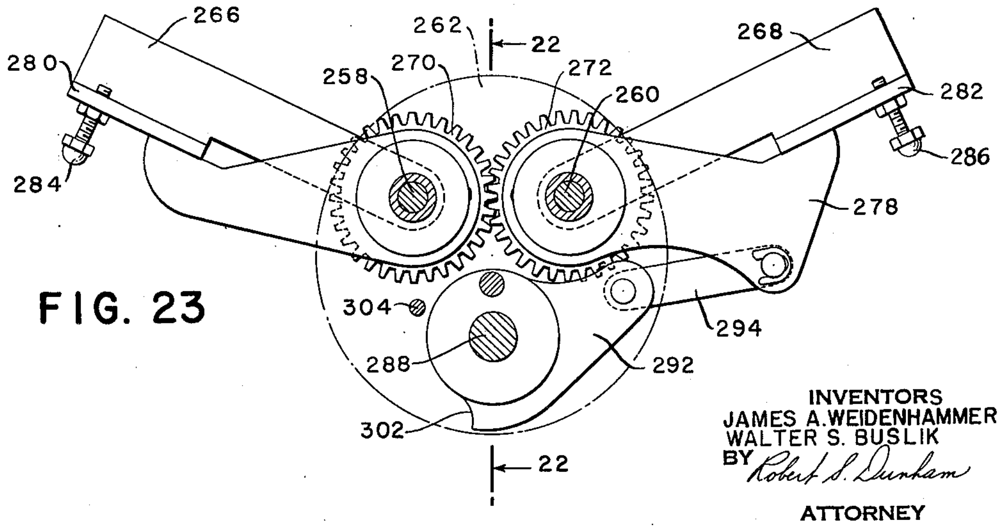
FIG. 23
INVENTORS
JAMES A. WEIDENHAMMER
WALTER S. BUSLIK
BY Robert S. Dunham
ATTORNEY

TAPE FEED MECHANISM

Original Filed May 28, 1952

INVENTORS
JAMES A. WEIDENHAMMER
WALTER S. BUSLIK
BY Robert S. Durham
ATTORNEY

INVENTORS
JAMES A. WEIDENHAMMER
WALTER S. BUSLIK
BY Robert S. Dunham
ATTORNEY

INVENTORS
JAMES A. WEIDENHAMMER
WALTER S. BUSLIK
BY Robert S. Dunham
ATTORNEY

KUnited States Patent Office 3,057,568

Patented Oct. 9, 1962

3,057,568

TAPE FEED MECHANISM

James A. Weidenhammer and Walter S. Buslik, Poughkeepsie, N.Y., assignors to International Business Machines Corporation, New York, N.Y., a corporation of New York Continuation of abandoned application Ser. No. 290,396, May 28, 1952. This application Sept. 19, 1955, Ser. No. 535,052

26 Claims. (Cl. 242—55.12)

This invention relates to a machine for reeling, unreeling and feeding tape, this application being a continuation of our prior application Serial No. 290,396, filed May 28, 1952 and now abandoned for Tape Feed Mechanism.

More particularly, the invention herein relates to a machine for feeding a record tape through a record reading and/or reproducing head. The invention was conceived as an adjunct to an electronic computing machine, but may be usefully employed in other environments where high speed tape feeding is a requirement.

With the advent of electronic computing machines, the need for rapid data input and data recording means has become very acute. Heretofore the speed at which data could be read from or recorded upon a record medium was in part limited by the speed at which existing equipment could feed such records through a record sensing or recording station.

The present invention contemplates a record tape feeding mechanism capable of feeding a record tape through a reading and recording head at a speed of 200 feet per second, with an acceleration and deceleration time of not more than .005 second, and with the ability to reverse direction of tape feed in ten milliseconds or less.

Production of high speed tape feeding equipment having rapid acceleration, rapid deceleration, and rapid braking rates encounters the difficulty that record tapes have no great tensile strength and that machines designed to handle such tapes must, therefore, impose no substantial tension on the tape. It is, therefore, the primary object of this invention to provide a record tape feeding mechanism which is capable of feeding a record tape through a record reading or reproducing head at high speed without imposing any substantial tension on such tape.

It is a further object of the invention to provide a record tape feeding mechanism having a high rate of tape acceleration and deceleration.

It is a further object of the invention to provide a record tape feeding mechanism having tape braking means which is capable of instantaneously halting tape feed.

Withal, it is an objective of this invention to provide a record tape feeding mechanism having means for feeding a record tape through a record reading and/or reproducing head that imposes a minimum amount of tension on the record tape being fed.

These and other objects and advantages of the invention are attained in a tape feeding mechanism having a pair of tape reels which may be independently rotated for either reeling or unreeling tape thereon. It is contemplated that each tape reel be power driven through a clutch mechaanism which is adapted to selectively drive the reel in either direction.

The clutch mechanisms herein are under control of the position of a tape loop depending from each reel and the control system is so designed as to maintain the tape loops substantially constant in length.

The tape loops provide a tape source upon which a tape feeding mechanism may call for tape to be fed through a record reading or recording head in either direction.

The mechanism for feeding the tape through the record reading and recording head is power driven, but in all respects independent of the power by which the tape reels are rotated. By means of the mechanism briefly described, the tape may be reeled or unreeled and fed through a record reading or reproducing head at high speed and without substantial tension on the tape.

The details of the mechanism illustrated in the drawings for the purpose of showing an operative embodiment of the invention will become clear as the description proceeds and in which like reference numerals indicate like parts, and wherein;

FIG. 21 is a view which corresponds in general to FIG. 15 but wherein is shown a modified form of mechanism;

FIG. 22 is a cross-sectional view through FIG. 21 taken on a line disposed axially in respect to the operating shafts;

FIG. 23 is a view taken from the rear of FIG. 21 to illustrate certain operating gears and linkages;

Figure 1:
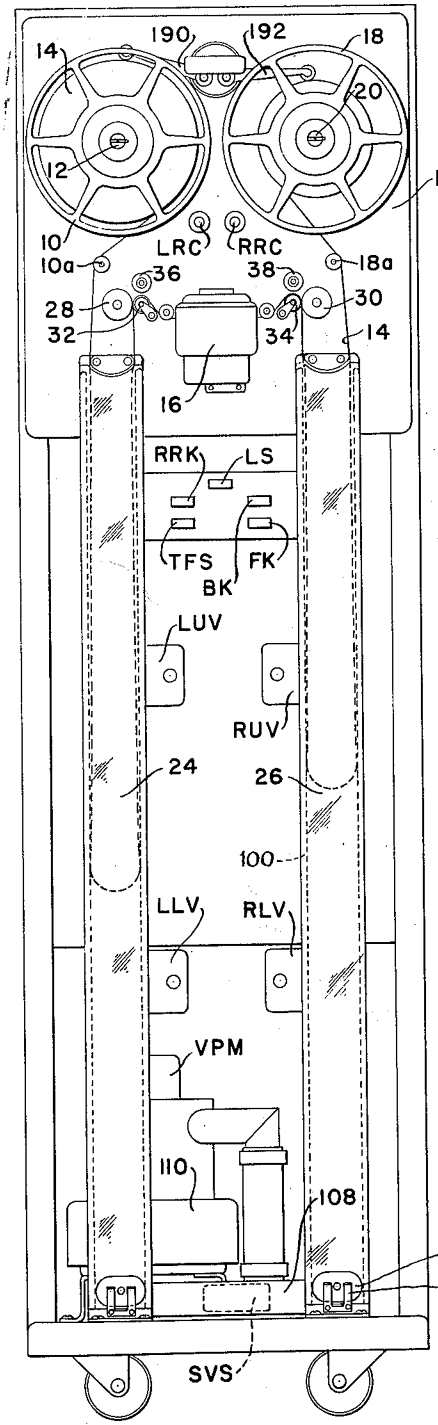
FIG. 1 is a front elevational view of the tape feeding mechanism with which this invention is concerned.
Figure 2:
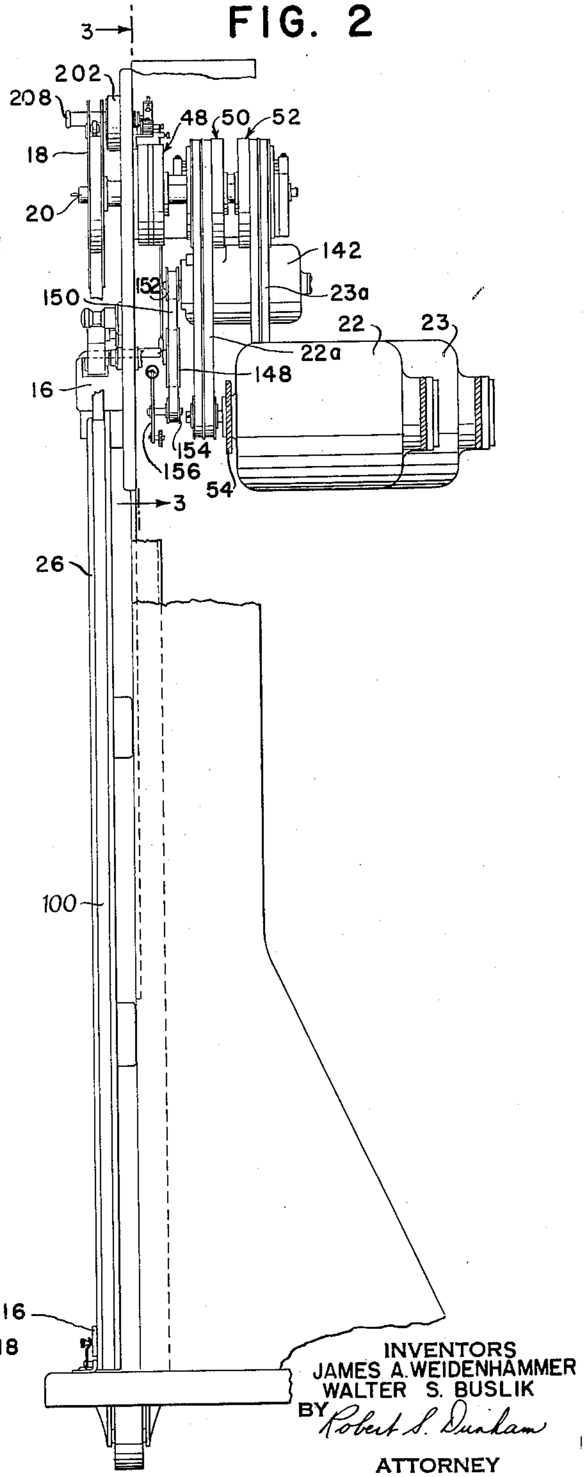
FIG. 2 is a side elevational view of the tape feeding mechanism with the upper portion of the outer casing broken away to show the location of underlying mechanism.

A general understanding of the machine and its function may be attained by reference to FIGS. 1 and 2 of the drawings. A pair of tape reels adapted to hold a coil of record tape are intermittently driven to provide a pair of tape loops upon which the mechanism for feeding the tape through the tape sensing head may call as the tape is to be fed in either of two directions. A tape reel 10 which we shall designate as a file reel is mounted on a drive spindle 12. It may be assumed that the reel 10 has thereon a coil of tape 14 on which data has been recorded and from which the tape is to be fed through a tape reading and recording head 16. In its forward feed direction, the tape will pass through the tape reading head 16 and will be coiled on a second reel 18 which may be designated herein as a machine reel. The machine reel 18 is mounted on a drive spindle 20.

The file reel drive spindle 12 and the machine reel drive spindle 20 are selectively rotated in either direction by a pair of motors 22 and 23. The motors 22 and 23 normally impart constant drive to a pair of electromagnetic clutch mechanisms mounted on each of the drive spindles 12 and 20. An electromagnetic brake is mounted on each of the drive spindles so that the spindles 12 and 20 may be locked against rotation. The nature of the electromagnetic clutches and the electromagnetic brake will be developed in greater detail at a later point herein.

Upon selective clutching of the electromagnetic clutch mechanisms in drive relation to the drive spindles 12 and 20, these spindles and consequently the tape reels attached thereto may be caused to reel or unreel tape from the coil thereon.

Since the mechanism is designed for high speed feed of tape through the tape head 16, it is important that a supply of tape be provided with little load or tension thereon, and to this end the driving mechanism for the reels 10 and 18 provides a pair of tape loops disposed in a pair of tape control columns 24 and 26. Each of the columns 24 and 26 has therein means responsive to the position of the respective tape loops for maintaining a relatively stable position of these loops within the columns. The loop sensitive means within the columns 24 and 26 control the reel drive mechanism in such manner that the loops, so to speak, are self-compensating. The tape reel drive mechanism for each reel operates independently of the other, and both reels are driven independently of feed of tape through the tape head 16.

Tape from the loop supply in the columns 24 and 26 is driven through the tape head 16 by means of a pair of constantly rotating tape drive capstans. In FIG. 1 a tape drive capstan 28 may be deemed to be constantly rotated in a clockwise direction, and may consequently be designated as the reverse drive capstan. A similar constantly rotating capstan 30 may be deemed to be driven in a counterclockwise direction and may, therefore, be designated as the forward drive capstan. In connection with the drive capstans 28 and 30, there are provided a pair of tape moving idler pulleys 32 and 34. The pulley 32 is adapted to move a tape trained thereabout into driving contact with the reverse drive capstan 28, while the tape moving pulley 34 is adapted to move a tape trained thereabout into driving contact with the forward drive capstan 30. As will be pointed out more fully as the description hereof proceeds, the tape moving idler pulleys 32 and 34 are mounted on a common linkage system which is so designed as to impart the proper related movement to the pulleys for selectively driving a tape either in a forward or a rearward direction through the tape head 16.

A non-rotary stop capstan is also associated with each of the tape moving idler pulleys, so that these pulleys may be moved into contact with their related stop capstans to hold the tape stationary. Thus the idler pulley 32 has associated therewith a stop capstan 36 which we shall designate herein as the forward stop capstan, and the tape moving idler pulley 34 has associated therewith a stop capstan 38 which we shall designate as the reverse stop capstan.

Figure 3:
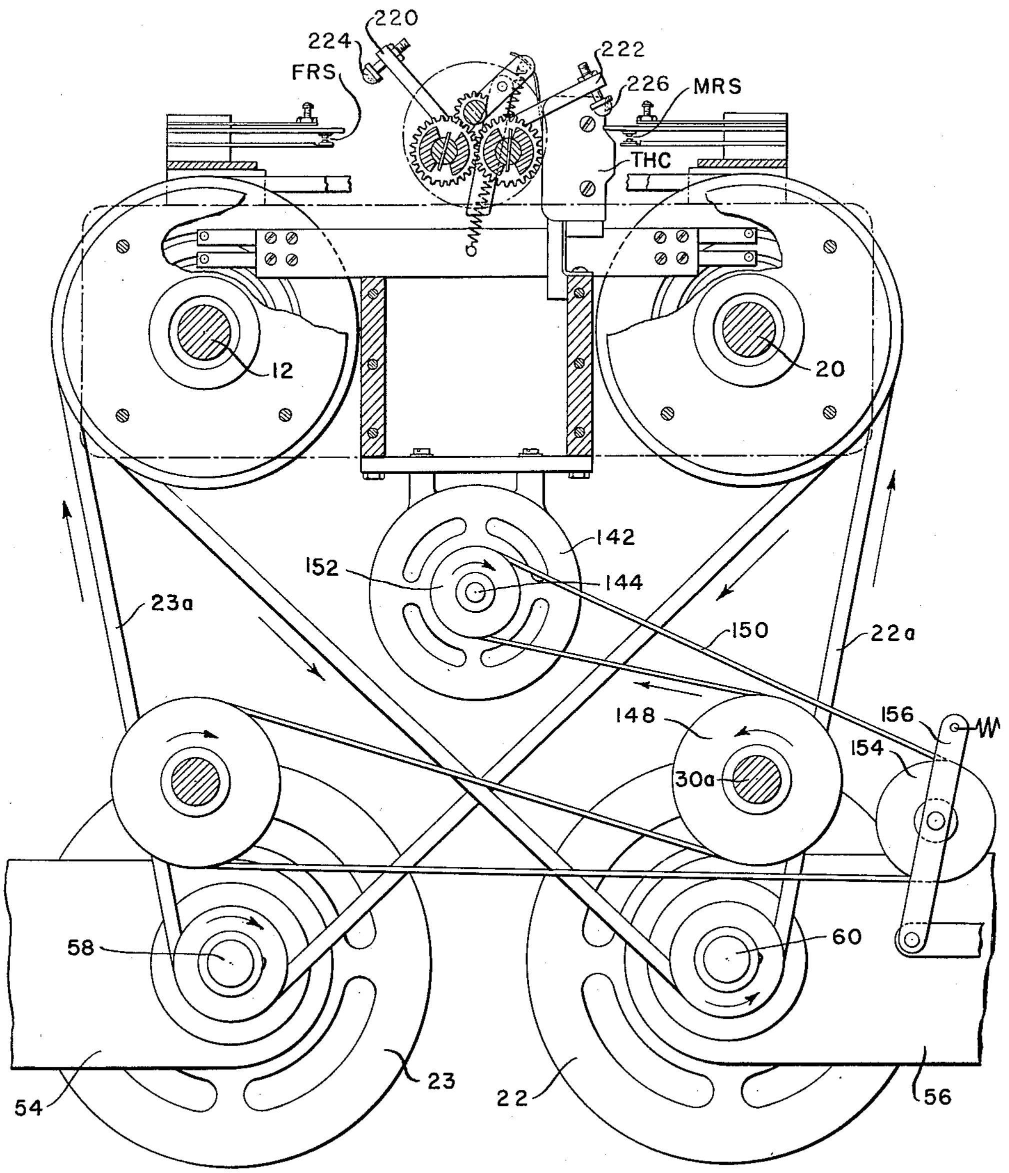
FIG. 3 is a view on line 3—3 of FIGS. 2 and 4 illustrating the tape driving mechanism and certain adjuncts thereto.
Figures 4, 5:
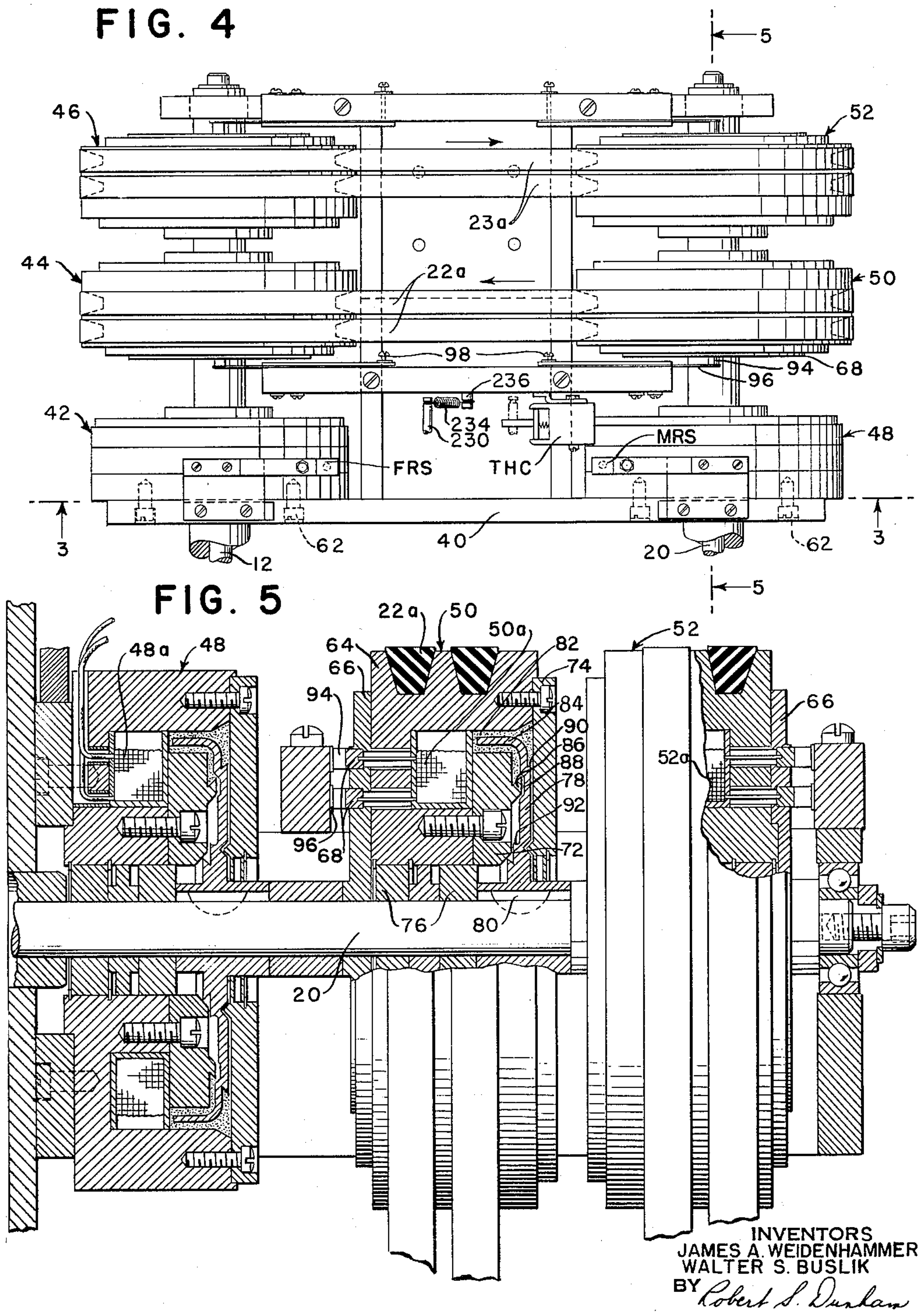
FIG. 4 is a plan view of the tape reel drive mechanism comprising electromagnetic clutches and brakes.
FIG. 5 is a view on line 5—5 of FIG. 4 showing parts in cross-section and other parts in full line.

The mechanism for driving the tape reels 10 and 18 may now be referred to in connection with FIGS. 3, 4 and 5 of the drawings. The spindles 12 and 20 are mounted for rotation in a frame member 40. The spindle 12 has mounted thereon a file reel brake 42, an electromagnetic reeling clutch 44 and an electromagnetic unreeling clutch 46.

The machine reel spindle 20 has mounted thereon an electromagnetic machine reel brake 48, an electromagnetic unreeling clutch 50 and an electromagnetic reeling clutch 52.

The drive rings of the clutch elements 44, 46, 50 and 52 are adapted for continuous rotation under the influence of the drive motors 22 and 23.

By reference to FIG. 3 of the drawings it will be seen that the drive motors 22 and 23 are mounted on supporting structures 54 and 56 respectively, in such position that the motor shafts 58 and 60 respectively extend forwardly into substantially vertical alignment with their related magnetic clutch structures.

By reference to FIG. 4 of the drawings it will be seen that the first pair of clutches 44 and 50 are in substantial, transverse alignment on their respective shafts and that the second pair of clutches 46 and 52 are also in substantial, transverse alignment on their respective shafts. The clutches 44 and 50 are driven in a counterclockwise direction by the motor 22 through a drive belt **22*a* while the clutches 46 and 52 are driven in a clockwise direction by the motor 23 through a drive belt 23*a*, the motor shaft 58 having a normal clockwise rotation and the motor shaft 60** having a normal counterclockwise rotation.

Noting FIG. 1 of the drawings, it may be seen that the file reel 10 is disposed for reeling tape thereon when driven in a counterclockwise direction, while the machine reel 18 is disposed for tape winding upon clockwise rotation. In light of this arrangement, the clutch 44 operates as a reeling clutch for the file reel 10 while the clutch 50 operates as an unreeling clutch for the machine reel 18. By the same token the clutch 46 operates as an unreeling clutch for the file reel 10, while the clutch 52 operates as a reeling clutch for the machine reel 18.

The file reel brake 42 and the machine reel brake 48 each has the outer shell thereof fixed to the frame member 40 my means of machine screws 62, thereby providing an anchor for these shells when either brake is energized to lock its respective shaft against rotation.

FIG. 5 of the drawings illustrates the specific nature of the brake and clutch units. These units are of identical structure, and a description of the clutch 50 will therefore suffice as a description of all. The driving member 64, including the ring or shell 50, is mounted on the shaft 20 for free rotation thereon. The driving member includes an end plate 66 in which is mounted a pair of commutator rings 68 which provide a current path for an electro magnetic coil **50*a* mounted within an annular recess in the driven member 64** and held therein by an annular plate 72. The opposite face of the structure has fixed thereto a closure plate 74. Suitable hub rings 76 support the driving member for rotation on the shaft 20.

A driven member 78 is spaced from and disposed between the annular plate 72 and the closure plate 74. The driven member 78 is keyed to the shaft 20 by means of a suitable keying structure 80.

It will be apparent now that when the driving member 64 and the driven member 78 are caused to rotate in unison, drive will be imparted to the shaft 20. Such drive coupling is achieved through the use of iron powder disposed between the driving member 64 and the driven member 78. The circumference of the annular plate 72 is such that its periphery is spaced from the inner wall of the recess formed in the driving member 64. This in effect forms an annular channel adapted to receive an inturned flange 84 of the driven member 78. The inturned flange 84 is so positioned as to provide a substantially equal space on opposite faces thereof in reference to the oppositely disposed walls of the annular channel. Iron powder in a sufficient amount to substantially fill the remaining space of the channel will serve to "freeze" the iron powder and thereby clutch the inturned flange 84 of the driven member 78 to the driving member 64 of the clutch structure whenever the coil 50*a* is energized.

Centrifugal force acting on the iron powder ordinarily maintains the powder in the channel adjacent the inturned end 84 of the driven member 78. However, in order to avoid possibility of the loss of the powder into the bearing structure of that assembly, the annular plate 72 is provided with an annular rib 86 which extends into an annular groove 88 on the inner face of the driven member 78. The annular rib 86 is outwardly slanted to provide a trough for powder that may find its way inwardly along the clutch structure. A similar rib 90 is formed on the outer face of the driven member 78 for preventing passage of powder inwardly along the outer face of the driven member. Any residual particles of powder will be caught in a groove 92 that is formed in the inner face of the driven member near the axial portion thereof.

The commutator rings 68 are in contact with a brush 94 carried on the end of a resilient contact strip 96 which is connected into the control circuit by means of terminal screws 98 (FIG. 4).

The clutches at the rear end of the spindles 12 and 20 are of the same construction as that described hereinabove, and their mounting on their respective shafts is the same except that they are reversed so that the end plate 66 is oppositely disposed to present the commutator rings in a more accessible position. The brake assembles 42 and 48 are also constructed exactly like the clutch assembly just described, and the manner of mounting these on their respective shafts is also the same with the exception that the end plate 66, and consequently the shell or what would correspond in the clutch assembly to the driven member, is held stationary. It now follows that the energization of the coils in the several clutch assemblies will result in the corresponding forward or reverse drive of the respective spindles 12 and 20. By the same token these spindles will be held against rotation whenever the coil in the brake assembly associated therewith is energized. Since the shells of the brakes 42 and 48 are fixed, the leads for energizing the electromagnetic coils therein may be taken through the end wall of the brake assemblies. As will be seen at a later point herein, the control circuit is such that drive through either of the clutches on a drive spindle will take place only upon the deenergization of the associated brake assembly coil, and that ordinarily the coil in the brake assembly will be energized to hold its associated spindle against rotation when the clutch coils are deenergized.

Figures 6, 7:
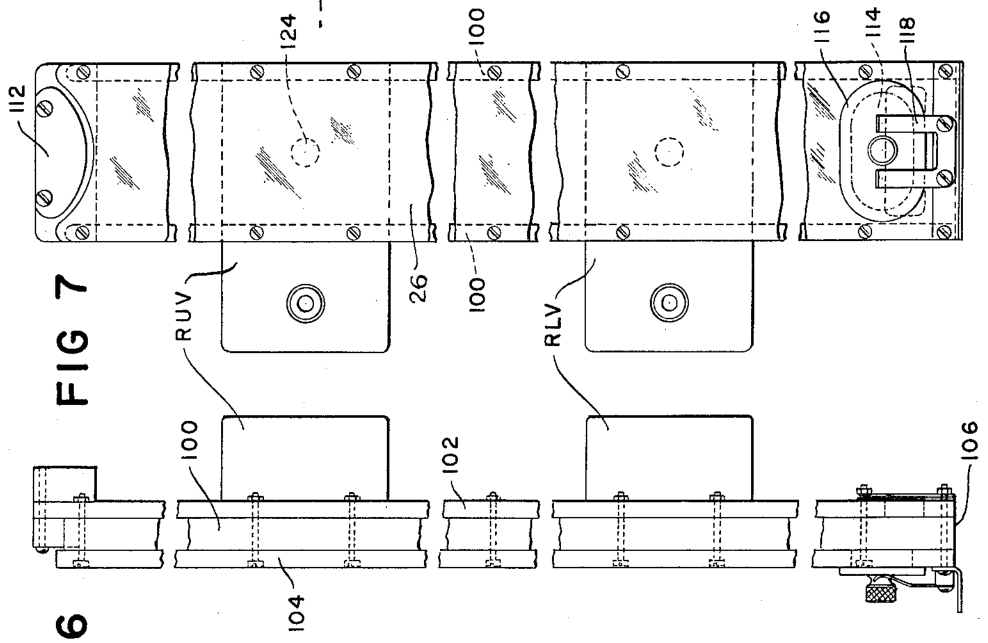
FIG. 6 is a side elevational view of a vacuum column provided for tape loop control.
FIG. 7 is a front elevational view of the vacuum column of FIG. 6.

It has been mentioned heretofore that the position of the tape loops in control columns 24 and 26 is utilized to control the rotary movement of the tape reels. Herein, by way of example, there has been illustrated a vacuum switch control system for achieving this objective. The control columns 24 and 26 are of the same construction, and the specific nature thereof may best be seen in FIGS. 6 and 7 of the drawings. In these figures of the drawings is illustrated the control column 26 shown at the right in FIG. 1. However, since the column 24 is of the same construction, a description of FIGS. 6 and 7 will serve as a description of both control columns. The column herein illustrated comprises a pair of side walls 100, a back panel 102, a transparent face panel 104 and a bottom wall 106, all joined togetheer in air-tight contact.

At the base of the columns 24 and 26 is a header 108 with which the columns communicate. The header 108 is connected with a vacuum pump 110 adapted to be driven by a suitable motor VPM. The foregoing provides a structure by means of which the control columns 24 and 26 may be evacuated when the upper ends thereof are closed against the atmosphere.

At the upper end of each control column is a guide plate 112, whose arcuate lower face is slightly spaced from a corresponding arcuate upper edge of the transparent face panel 104. The lateral extremities of the guide plate 112 serve to support the opposite bights of a tape loop within the control column and the arcuate slot formed between the lower arcuate face of the guide block and the upper edge of the face panel constitutes a guide through which a tape loop may be threaded for insertion into the control column. The face plate 104 has formed at the bottom thereof a hand opening 114 normally closed by an air-tight closure 116 held in position by a spring clip 118. This opening constitutes a cleancut passage.

The side walls 100 of the vacuum columns 24 and 26 are of a width substantially equal to the width of the tape 14. When a tape loop is formed, therefore, in either of the vacuum columns 24 or 26, the oppositely disposed marginal edges of the loop will be in substantial contact with the base plate 102 and the face plate 104 of the respective vacuum columns. The back of the tape in the tape loop is spaced from the side walls of the vacuum columns through substantially the entire length of the loop but the bight of the loop is in substantial contact with the side walls. This disposition of the tape loop within the vacuum columns 24 and 26 is assured by the tape guide structure. As the tape comes from the file reel 10, it passes over a guide idler 10*a*. As the tape is fed to and from the machine reel 18, it too passes over a guide idler 18*a*. The horizontal distance between the outer periphery of the guide idler 10*a* and the drive capstan 28 is somewhat less than the spacing of the inner faces of the column side walls 100. The same is true of the horizontal spacing of the guide idler 18*a* and the drive capstan 30 at the right of the structure.

The particular horizontal spacing of the guide idlers and their associated drive capstans assures that the inner face of the tape is in contact with the oppositely disposed ends of the guide plate 112 at the top of the vacuum columns 24 and 26. These guide plates, therefore, determine the spacing of the tape bights at the entrance to the columns. Since the distance between the ends of the guide plate 112 is somewhat less than the internal width of the vacuum columns, the back of the tape will be spaced slightly from the column side walls through the major portion of the tape loops, the loops, however, widening out at their lower ends to contact the side walls of the columns, thereby forming an air seal between the lower portion of the tape loop and the column walls.

Figure 8:
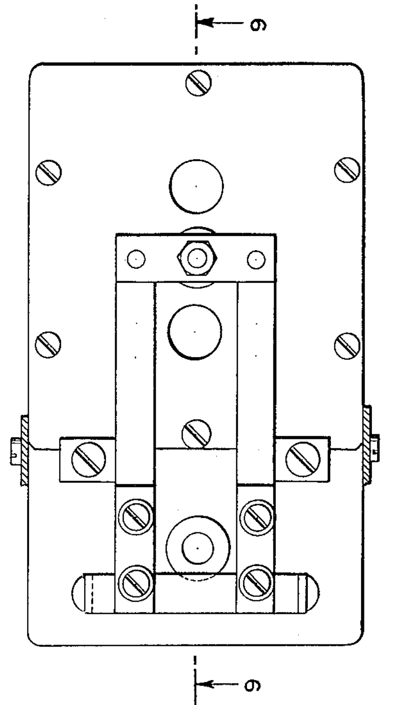
FIG. 8 is a plan view of a vacuum operated switch used in connection with the vacuum columns of FIGS. 6 and 7.
Figure 9:
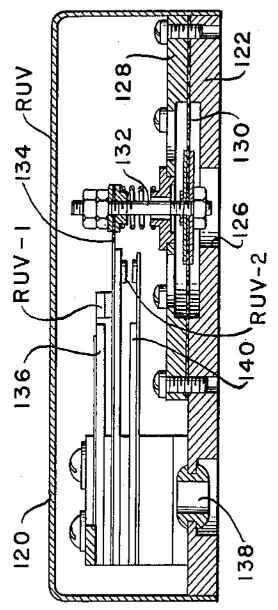
FIG. 9 is a cross-sectional view on line 9—9 of FIG. 8.

Spaced along the length of each of the control columns 24 and 26 are two vacuum operated switches, the details of which are shown in FIGS. 8 and 9. In FIG. 1 of the drawings the vacuum switch LUV is the left upper vacuum switch, while the switch LLV is the left lower vacuum switch. In similar fashion the control column 26 has a right upper vacuum switch RUV and a right lower vacuum switch RLV.

The vacuum switches have a normally closed contact point and a normally open contact point. The switches communicate with the interior of their respective control columns through an aperture in the back plate 102 thereof. By reference to FIG. 9 it will be seen that the switch structure is encased in a shell 120 which fits tightly against a base plate 122, the base plate being attached to the back panel 102 of the control column so that an aperture 124 of the back panel registers with a passage 126 in the base 122 of the switch structure. Within a cavity formed between the base plate 122 of the switch structure and an overlying block 128 is a pressure responsive diaphragm 130 to which a contact operating shaft 132 is attached, this connection between the diaphragm and the shaft 132 being air-tight. Adjustably secured to the opposite end of the contact operating shaft 132 is a spring contact finger 134 having contact points thereon adapted to contact corresponding points on fixed contact fingers 136 and 140.

In FIG. 9 the spring contact finger 134 has a contact point on the upper surface thereof which is adapted to engage a contact point on the fixed contact finger 136. These contacts are normally closed contacts and are designated herein as the RUV–1 contacts. On the lower face of the spring contact finger 134 is a second contact point which is adapted to engage a corresponding contact point on the fixed contact finger 140. These contact points are normally open and are designated herein as the RUV–2 contact points. In FIG. 9 the contact points shown therein are associated with the upper right vacuum switch. A similar structure is provided for the right lower vacuum switch RLV, the left upper vacuum switch LUV and the left lower vacuum switch LLV (FIG. 1). In the circuit description in respect to FIG. 29 of the drawings it will be seen that the left upper vacuum switch LUV has a pair of points LUV–1 and LUV–2 which correspond to the points RUV–1 and RUV–2 described in connection with FIG. 9. The same is true of the points in vacuum switches LLV and RLV.

Under the foregoing conditions, any time that a switch diaphragm such as 130, for example, is subjected to vacuum within its vacuum column, atmospheric pressure on the opposite side of the diaphragm will cause transfer of the switch points, i.e. the points RUV–1 of FIG. 9, for example, will open, while the points RUV–2 will close.

Electrical connections with the switch blades are made through a connecting bushing 138 at one end of the base plate 122.

During normal operation of the machine, the tape loops in columns 24 and 26 will be disposed between switches RUV—RLV and LUV—LLV of the respective column pairs. Under these conditions the switches LUV and RUV are subject to atmospheric pressure only, whereas switches LLV and RLV are influenced by vacuum in the columns 24 and 26, the tape loops constituting a column air seal above the switches LLV and RLV.

The device is designed so that the tape loops in the control columns 24 and 26 are maintained between the respective upper and lower vacuum switches. To this end the vacuum switch LUV is in the control circuit of the magnetic coil in the unreeling clutch 46, while the vacuum switch LLV is in the control circuit for the magnetic coil of the reeling clutch 44. In like manner the vacuum switch RUV is in the control circuit of the unreeling clutch 50, while the vacuum switch RLV is in the control circuit for the reeling clutch 52.

Should either tape loop drop below its lower vacuum switch, such switch will be subject to atmospheric pressure on both sides of its diaphragm 130, causing the contact points thereof to transfer. Consequently, under such conditions the switch LLV will call into action the file reel reeling clutch 44 and the switch RLV will call into operation the machine reel reeling clutch 52.

Such tape loops will be taken up by the reeling action of the respective reels, or either thereof, until the bight of the loop is above the lower control column switch, whereupon the switch will again transfer its contact points under influence of vacuum within the column.

In like fashion the upper vacuum switches LUV and RUV which are subjected to atmospheric pressure on both sides during normal operation of the machine will transfer their contact points when the bight of the tape loop rises above these switches. Under these conditions the upper switch will be subject to the vacuum within their respective control columns. The low pressure on the inner side of the diaphragm 130 will thereupon permit atmospheric pressure on the opposite side to transfer the contact points of the upper switch structure. Upon such transfer the switch LUV will serve to energize the coil in the unreeling clutch 46, and the switch RUV will call into action the unreeling clutch 50 whereby the file reel 10 and machine reel 18 respectively, or either one of them, will be rotated to unreel tape therefrom and thereby lengthen the loop in the control columns 24 and 26 respectively until the bight thereof once more drops below the upper switches LUV and RUV.

From the foregoing it will be seen that the operation of the tape reels 10 and 18 is in effect a self-compensating operation whereby the tape loops in the control columns 24 and 26 are maintained in an optimum position. Furthermore, it is apparent that the controls for the reels 10 and 18 are independent one from the other.

The second contact point of each vacuum switch is used to provide a circuit for their respective brake coils. When the control circuit is described, it will appear that a circuit is established through closed points of switches LUV and LLV to energize the coil of the file reel brake 42 and that a circuit is provided through closed points of switches RUV and RLV to energize the coil in the machine reel brake 48. It is intended that the brake coils be energized whenever the reeling and unreeling clutches are deenergized.

Figure 10:
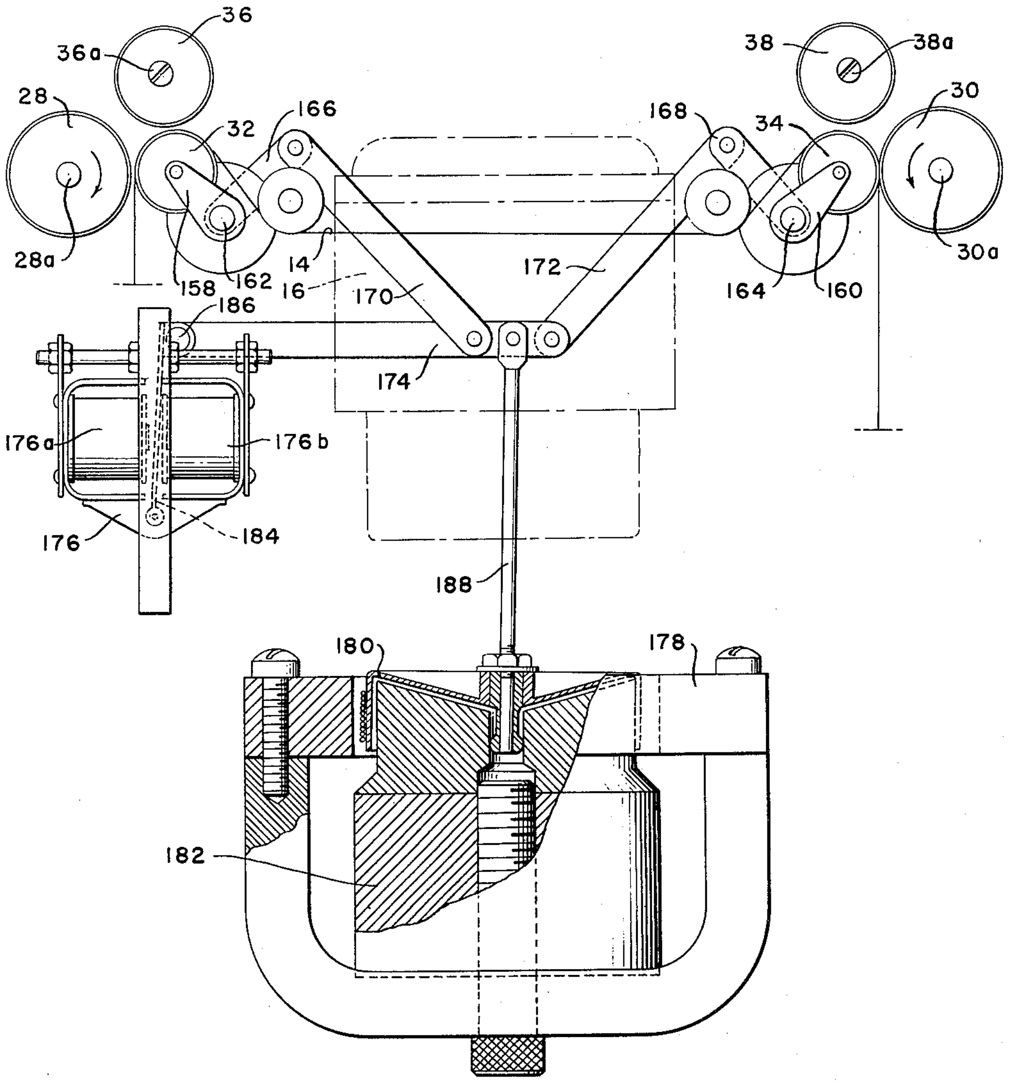
FIG. 10 illustrates the tape drive mechanism and the means for biasing the mechanism into tape driving position, the view showing the parts biased into position for driving the tape in a forward direction.
Figures 11, 12:
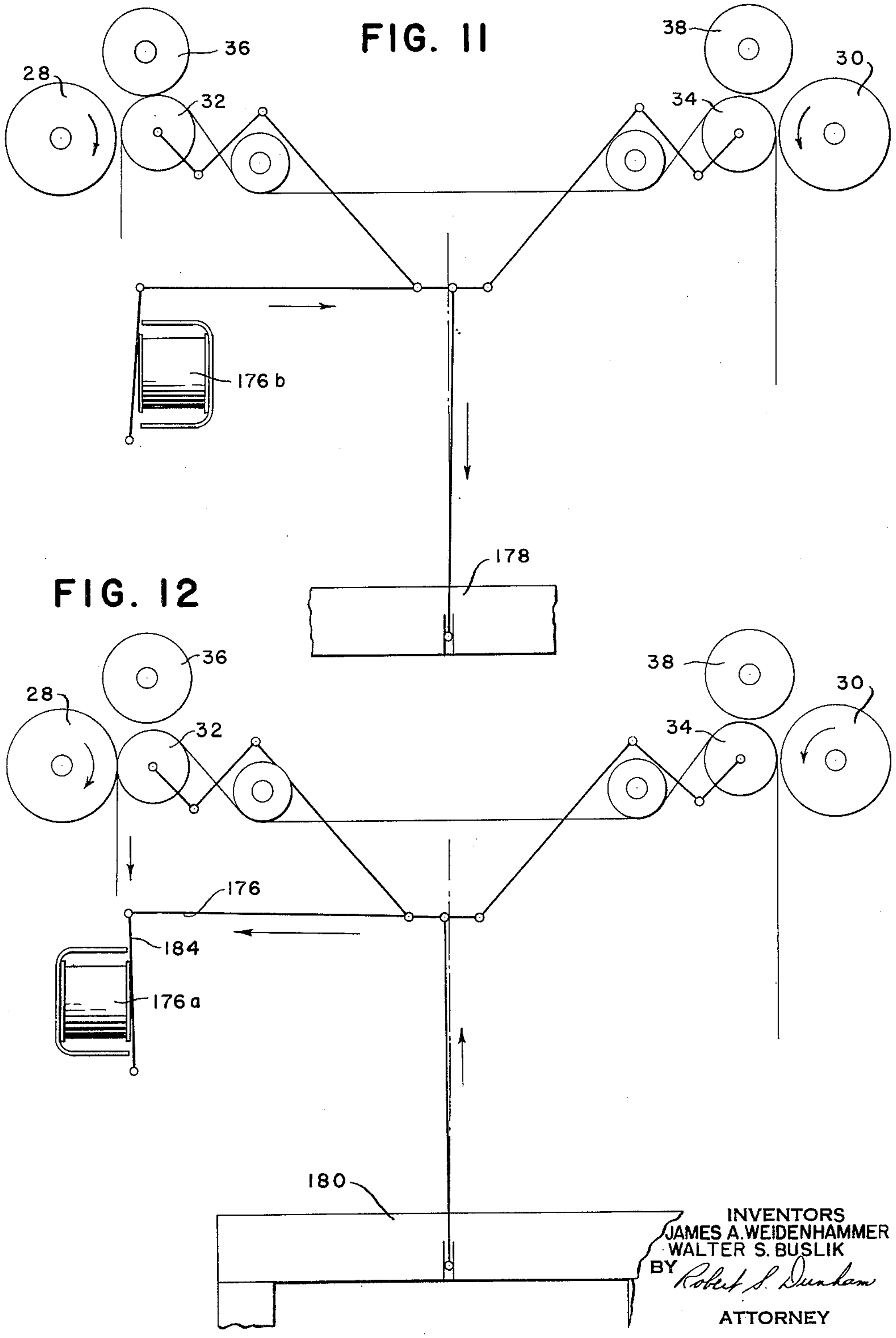
FIG. 11 is a diagrammatic view of the mechanism shown in FIG. 10 with the parts thereof biased into position to stop tape movement following feed of tape in a forward direction.
FIG. 12 is a diagrammatic view such as that in FIG. 11 and shows the mechanism biased into position to effect reverse feed of the tape.
Figure 13:
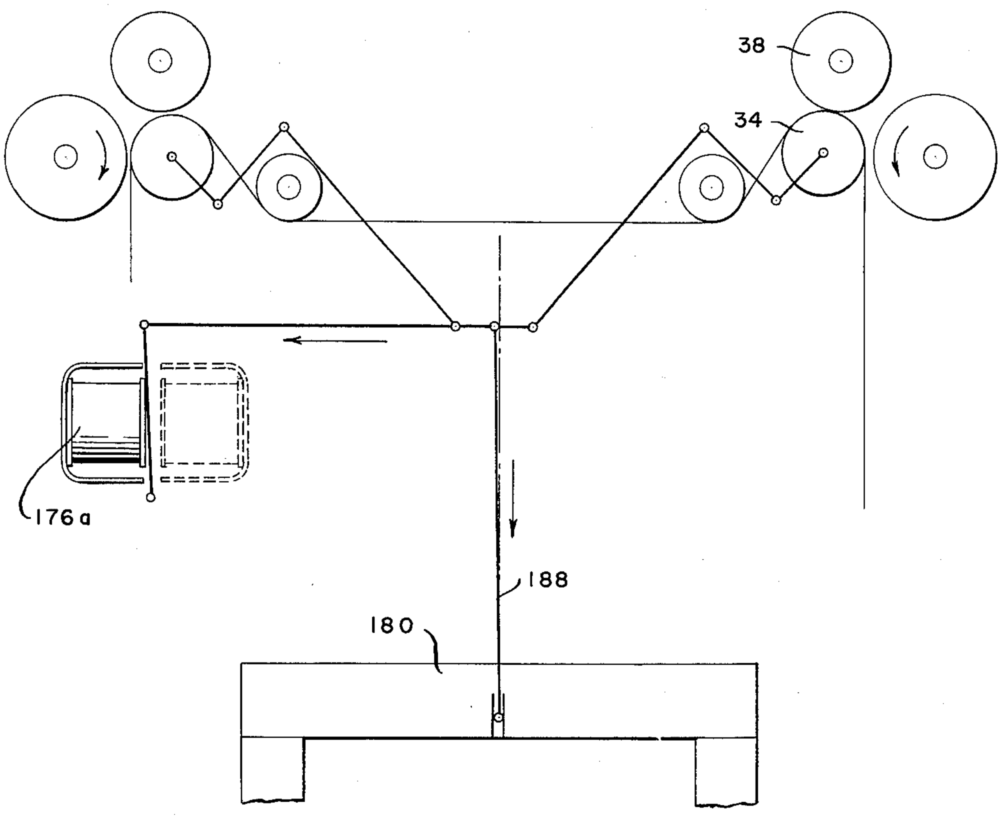
FIG. 13 is a diagramatic view such as those in FIGS. 11 and 12 with the parts biased into position to halt tape feed following reverse feed of the tape.

The mechanism for driving the tape through the tape head 16 in a forward direction is shown in FIG. 10 of the drawings, FIGS. 11 through 13 diagrammatically illustrating the other drive and stop positions. The drive capstans 28 and 30 are constantly driven by means of a motor 142 (FIG. 3) whose shaft 144 rotates in a clockwise direction. The drive capstans 28 and 30 are journalled for rotation in the face panel 13 of the machine, and the shafts 28*a* and 30*a* extend to the rear of the panel 13 where they have affixed thereto belt pulleys 146 and 148 respectively. A drive belt 150 is trained about the pulleys 146, 148 and about a motor shaft pulley 152 so that upon clockwise rotation of the motor shaft 144 the capstan shaft 28*a* will be rotated in a clockwise direction while the capstan shaft 30*a* will be rotated in a counterclockwise direction. This is accomplished by the use of an idler pulley 154 mounted on a spring-biased lever 156.

By reference to FIG. 10 of the drawings it will be seen that the tape moving idler pulleys 32 and 34 are mounted for rotation at the free end of levers 158 and 160 respectively. The inner ends of the levers 158 and 160 are fixed to pivot shafts 162 and 164 respectively. The pivot shafts 162 and 164 are journalled for rocking movement in the face panel 13, and each of these shafts has attached thereto a short, upwardly extending link 166 and 168 respectively. The inner, free ends of the links 166 and 168 have pivoted thereto levers 170 and 172 respectively which have their opposite ends pivoted to a common operating lever 174.

With the foregoing structure the tape moving idler pulleys 32 and 34 may be selectively engaged with their related drive capstan and with their stop capstan. Thus the tape moving idler pulley 32 may be brought into contact with the reverse drive capstan 28 or with the forward stop capstan 36. The tape moving idler pulley 34 may be selectively engaged with the forward drive capstan 30 or with the reverse stop capstan 38. The stop capstans 36 and 38 are eccentrically mounted in the face panel 13 by means of screws 36*a* and 38*a* about which the capstans may be adjusted to vary their braking effect.

In order to impart controlled movement to the tape moving idler pulleys 32 and 34, there has been provided herein a forward-reverse actuator 176 comprising a pair of aligned, high speed relay magnets 176*a* and 176*b* and a stop or drive actuator 178 which consists of a coil 180 in a field of high flux density caused by a permanent magnet 182. The high speed relay coils 176*a* and 176*b* are mounted on a supporting yoke in axial relation to each other and with the provision of a space between the magnets to accommodate a pivoted armature 184 to the free end of which the operating lever 174 is attached by means of a pivot stud 186.

The coil 180 of the stop-drive actuator has affixed thereto a rod 188 which is connected to the operating lever 174 midway between the connections of the levers 170 and 172.

When the relay magnet 176*b* is energized, the armature 184 will be attracted thereto and the operating lever 174 will be biased to the right in FIG. 10. This elevates the tape moving idler 32 a half gap width above the tape moving idler 34. When the stop-drive actuator 178 is energized to repel the coil 180 thereof, an upward thrust will be delivered to the rod 188. This will further move the drive linkage to force the tape moving idler pulleys downwardly and outwardly until the tape moving idler pulley 34 is engaged with the forward drive capstan 30. This will cause the tape 14 to be driven downwardly into the control column 26.

The foregoing describes one of four stable positions into which the tape moving idler pulleys may be biased. The three other positions are illustrated in FIGS. 11, 12 and 13 of the drawings.

FIG. 11 shows the position of the tape moving idler pulleys for stopping tape feed following forward feed of the tape. At this point it may be appropriate to mention that the tape is always pulled through the tape head 16 and is stopped by braking the tape at a position behind the tape head 16. This will insure sufficient tape tension at the tape head 16 at all times.

Reverting to FIG. 11 of the drawings it will be seen that the tape 14 is stopped by engaging the tape between the forward stop capstan 36 and the tape moving idler pulley 32. To achieve this function, the magnet 176*b* must remain energized, but the flow of current through the stop-drive actuator 178 is reversed whereby the coil 180 is attracted to the permanent magnet 182. This results in a downward pull on the rod 188. Such pull on the linkage system will tend to raise both tape moving idler pulleys 32 and 34, but since the tape moving idler pulley 32 in the forward drive position was higher than the pulley 34, the idler pulley 32 engages the forward stop capstan 36 to brake tape movement. Engagement between the tape moving idler pulley 32 and its forward stop capstan 36 results from the upward bias given to the tape moving idler pulley 32 under the influence of the magnet 176*b*.

In FIG. 12 of the drawings, the tape 14 is moving in a reverse direction. To bias the tape moving idler pulley 32 into contact with the reverse drive capstan 28, it is necessary to energize the magnet 176*a*. This attracts the armature 184 and pulls the operating lever 176 to the left in FIG. 12. This will serve to drop the tape moving idler pulley 32 one-half gap below the idler pulley 34 and condition the tape moving idler pulley 32 for engagement with the reverse drive capstan 28 when the moving coil 180 is energized to cause an upward movement of the rod 188. Such movement will serve to project the tape moving idler pulley 32 into engagement with the reverse drive capstan 28, whereby the tape 14 is driven in a reverse direction, i.e. from right to left in FIG. 3 of the drawings.

The reverse stop position of the tape drive mechanism is shown in FIG. 13 of the drawings, wherein the tape moving idler pulley 34 is brought into engagement with the reverse stop capstan 38. To achieve this engagement, the magnet 176*a* must remain energized but the current in the moving coil 180 is reversed, whereby the coil is pulled downwardly so that the rod 188 exerts a downward pull on the operating lever 174 with a consequent upward bias of the tape moving idler pulley 34 into contact with the reverse stop capstan 38.

In FIG. 1 is shown a pair of tape contact arms 190 and 192. These arms are mounted for pivoting movement so that the ends thereof may ride freely in contact with the tape coils on the respective reels 10 and 18. Through this medium is provided a control mechanism to prevent the complete run-out of tape from the reels. FIGS. 14 through 20 illustrate the particular details of one form of tape arm mechanism, while FIGS. 21 through 23 show a modified form. Specific reference may first be made to that form of the mechanism shown in FIGS. 14 through 20.

Figures 18, 19, 20:
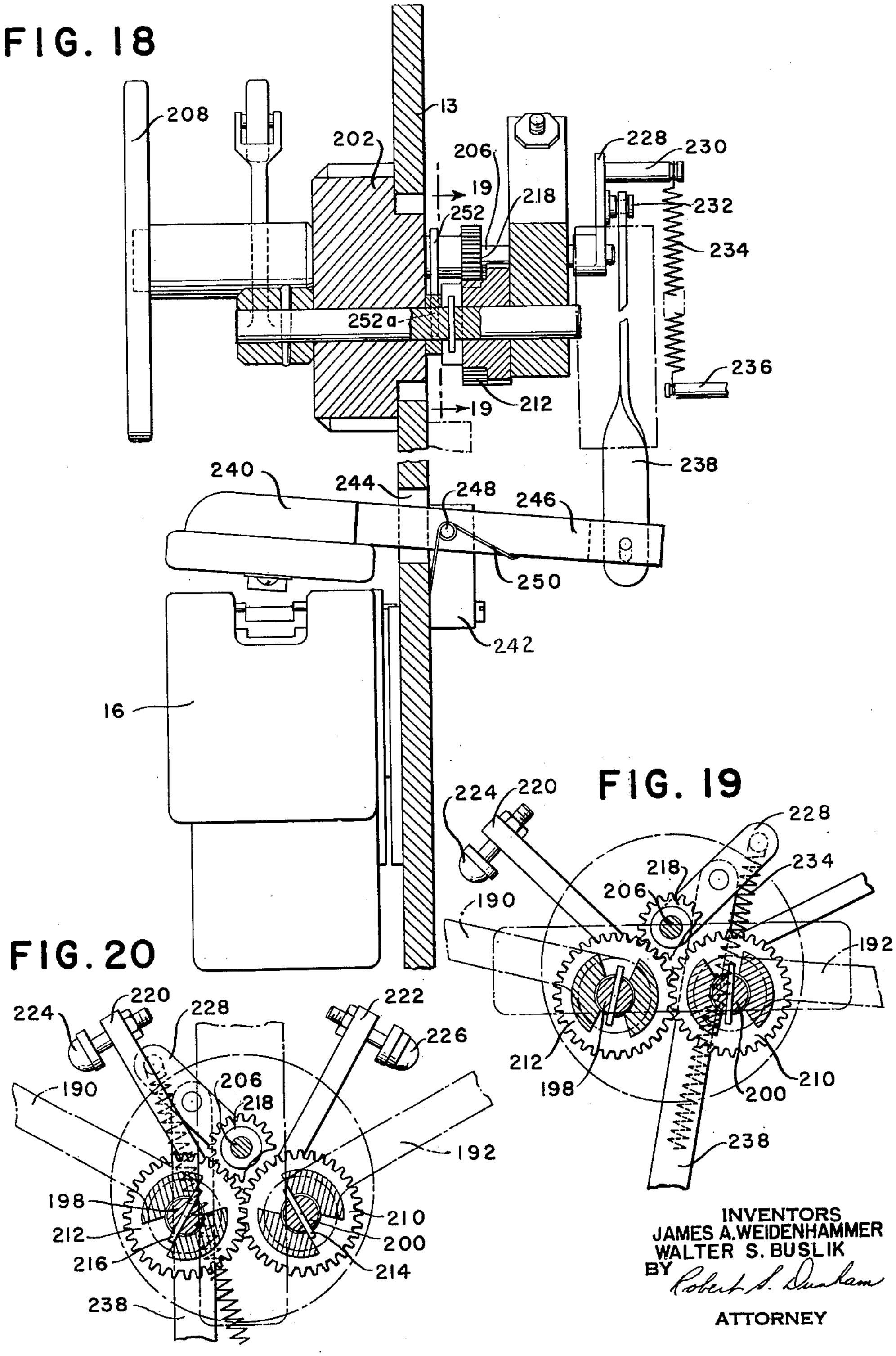
FIG. 18 is a view corresponding in general to FIG. 14, wherein parts are shown in cross-section and showing also the connection between the tape coil sensing mechanism and a tape reading head mechanism whereby relative separation between a tape reading head and its cover is effective.
FIG. 19 is a sectional view on line 19—19 of FIG. 18 showing the position of the parts with the tape coil sensing arms in one position.
FIG. 20 is a view similar to that of FIG. 19 but shows the respective parts in a different position of adjustment.

The tape arms 190 and 192 have tape contacting rollers 194 and 196 at the free ends thereof. These rollers are freely rotatable in the bifurcated free end of the arms 190 and 192 respectively, so that they ride lightly on the tape coil of the tape reels 10 and 18. The inner ends of the arms 190 and 192 are keyed to shafts 198 and 200 respectively. These shafts are journalled for rocking movement in a mounting block 202 which has a flange 204 by means of which the mounting block is mounted in the face panel 13 of the machine as shown in FIGS. 1 and 18. An operating shaft 206 is mounted for rocking movement in the block 202 at a point midway between the shafts 198 and 200 and slightly thereabove. The forwardly projecting end of the operating shaft 206 has an operating handle 208 affixed thereto.

Figures 16, 17:
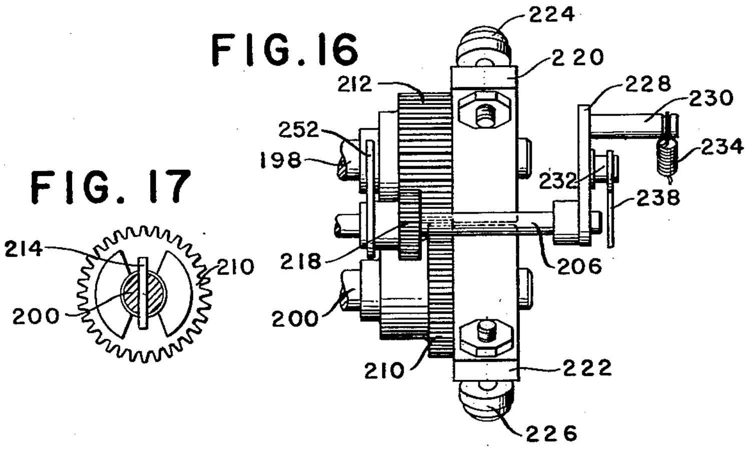
FIG. 16 is a view on line 16—16 of FIG. 14.
FIG. 17 is a detail view of a lost-motion mounting for the gear element employed in the construction of FIGS. 14 through 16.

The distal ends of the shafts 198, 200 and 206 extend beyond the rear face of the mounting block 202 at which point intermeshing gears are mounted on the respective shafts. The shafts 198 and 200 have mounted thereon a pair of gears for limited rotation in respect to the shaft. FIG. 17 of the drawings illustrates one of these gears which may be recognized as the gear 210 on the shaft 200. The other shaft 198 has a gear 212 mounted thereon in similar fashion to permit limited relative movement between the shaft and the gear.

The relative movement between the shafts 198 and 200 and their respective gears 212 and 210 is for the purpose of permitting movement of the respective arms 190 and 192 and a pair of contact making and breaking fingers 220 and 222 which are fixed to the ends of shafts 198 and 200, respectively, without reference to rotation of the operating handle 208.

With reference to FIGS. 17, 19 and 20 of the drawings, it will be seen that the gears 210 and 212 are formed with a pair of outwardly diverging slots, and that a pair of pins 214 and 216 carried by the shafts 200 and 198, respectively, extend into the slots of their associated gears. Thus while the gears 210 and 212 are adapted for limited movement in respect to their respective shafts 200 and 198, the slot walls will engage the pins 214 and 216 and rotate the shafts 198 and 200 when engagement between the pins and the slot walls is effected, as during rotation of the handle 208.

The manner in which movement of the handle 208 is imparted to the gears 210 and 212 is as follows. The operating shaft 206 has a gear 218 keyed thereto, and this gear, as best seen in FIG. 16 of the drawings, is in driving contact with the gear 212, this latter gear being relatively wide. The gear 210 in turn is in mesh with and drives the gear 212. By means of this arrangement, rotation of the shaft 206 is imparted through the gear 218 to the gear 212 and to the gear 210 with the consequence that the shafts 198 and 200 are rotated when the respective pins 216 and 214 come into engagement with the slot walls in their associated gears.

As intimated hereinabove, the shafts 198 and 200 have attached thereto a pair of circuit making and breaking fingers 220 and 222, respectively. The free ends of these fingers mount adjustable studs 224 and 226, respectively. Contact between the studs 224 and 226 and a pair of normally open file and machine reel contacts FRS and MRS, respectively, shown at the top of FIG. 3 of the drawings will influence the control circuit as will be more fully described at a later point herein.

From the foregoing it will be seen that rotation of the handle 208 will transmit a torque through the gears to the tape contact arms 190 and 192 and to the circuit making and breaking fingers 220 and 222 to elevate the arms and the fingers. While the lost-motion connection between the gears 210 and 212 and their respective shafts 200 and 198 permits raising of the tape contact arms 190 and 192 and the circuit making and breaking fingers 220 and 222, the contact arms 190 and 192, and consequently the circuit making and breaking fingers 220 and 222, are free to follow the tape coil on the reels 10 and 18.

The inner end of the operating shaft 206 has a plate 228 attached thereto, and this plate carries a pair of rearwardly extending studs 230 and 232. The stud 230 supports one end of a coil spring 234 which has its other end attached to a fixed pin 236. The stud 230 is so located on the plate 228 that the torque of the spring 234 is along a line which includes the shaft 206 when the operating handle 208 is in a vertical or open position. Through this medium the mechanism just described has a stable, open position under the influence of the spring 234. The second stud 232 mounts an operating link 238 by means of which a tape head cover is opened and closed.

The tape head 16 (see particularly FIG. 18 of the drawings) has a cover 240 pivoted on a block 242 which is attached to the rear face of the machine panel 13. Immediately to the rear of the tape head 16 and slightly thereabove is an aperture 244 through the face panel of the machine, providing passage for a rearwardly projecting extension 246 of the reading head cover 240. By reference to FIG. 18 of the drawings it will be seen that the cover 240 is pivoted on the block 242 by means of a pivot pin 248 about which the cover may rock into open and closed position in respect to the head 16. A spring 250 is coiled about the pivot pin 248 and has oppositely disposed portions, one of which engages the rear face of the machine face panel and the other of which engages the lower face of the rearwardly projecting cover extension 246. By this arrangement the cover 240 is normally biased into closed position.

Rocking movement of the shaft 206 in the bearing block 202 is limited by means of a stop plate 252 which is adapted to engage a stop pin 252*a* at the rear of the face of the block 202. The stud 230 is also adapted to open and close a thread handle switch THC as will be developed more fully hereinafter.

Figures 14, 15:
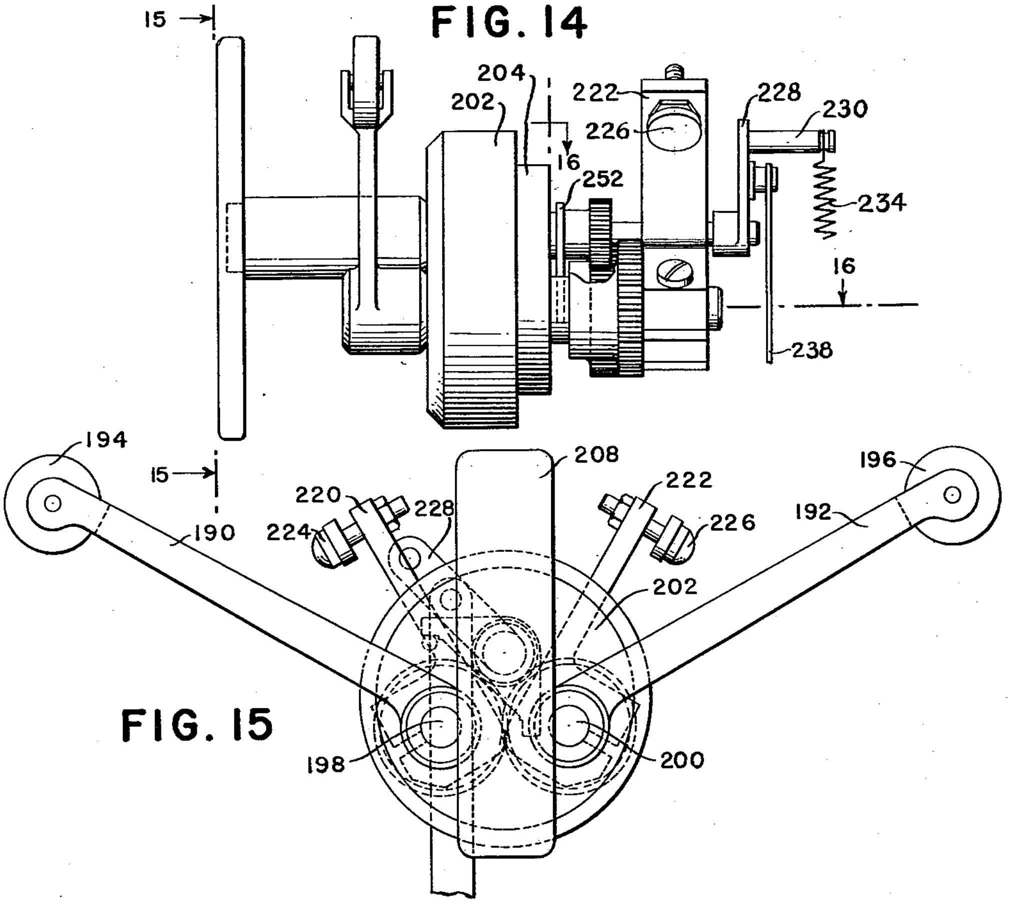
FIG. 14 is a side elevational view of certain tape coil sensing mechanism.
FIG. 15 is a front elevational view of mechanism along line 15—15 of FIG. 14 showing in particular a pair of tape coil sensing arms and associated contact operating fingers.

From the foregoing it will be apparent that whenever the operating handle 208 is rotated to a vertical position such as that shown in FIGS. 15 and 18 of the drawings, the tape contacting arms 190 and 192, and consequently the tape contacting rollers 194 and 196, will be raised so that tape reels may be removed from or placed upon the spindles 12 and 20. At the same time, the circuit making and breaking fingers 220 and 222 will be elevated. Concurrent with these movements is the opening of the tape head cover 240 through stud 232, operating link 238 and the rearwardly projecting cover extension 246. With the mechanism in open or elevated position, the spring 234 will hold the parts in such position to permit the changing of reels and threading of tape as may be required.

When the operating handle 208 is returned to its horizontal position, the tape sensing arms 190 and 192 will return to their normal position in contact with the tape coil on the associated tape reels 10 and 18. It may be noted, however, that the lost-motion connection between the shafts 198 and 200 will permit independent movement of the tape sensing arms 190 and 192 and their associated circuit making and breaking fingers as may be required by the size of the tape coil on either of the reels 10 or 18.

The modified tape contact arm mechanisms shown in FIGS. 21 through 23 of the drawings have effective operations which are substantially the same as those of the form shown in FIGS. 14 through 19 of the drawings but perform these operations in a somewhat different fashion. In this form of the invention a pair of tape contact arms 254 and 256 are secured to the front end of a pair of shafts 258 and 260, respectively. The shafts 258 and 260 are mounted for rocking movement in a mounting block 262 which has a flange 264 by which the block may be mounted in the face panel 13 of the machine. Attached to the rear end of the shafts 258 and 260 are a pair of circuit making and breaking fingers 266 and 268, respectively. Mounted for free rotation on the shafts 258 and 260 are a pair of gears 270 and 272 respectively. These gears have elongated hubs 274 like that shown in reference to the gear 272 in FIG. 22 of the drawings. Affixed to the elongated hub portion of the gears for rotation therewith are a pair of fingers 276 and 278. Each of the circuit making and breaking fingers 266 and 268 has an outwardly turned flange portion 280 and 282, respectively, which overlies the outer extremities of the fingers 276 and 278, respectively. As a consequence of this relationship, whenever the fingers 276 and 278 are elevated, their extremities may engage their related flanges 280 and 282 respectively and thereby elevate the circuit making and breaking fingers 266 and 268. This motion results in the rocking of shafts 258 and 260 with the result that the tape contact arms 254 and 256 are also elevated. The circuit making and breaking fingers 266 and 268 have at their extremities adjustable studs 284 and 286, respectively, which are adapted to contact and close the reel switches FRS and MRS, respectively, shown in FIG. 3 of the drawings when either or both of these circuit making and breaking fingers are in their lower position. Thereby, the reel switches will be closed whenever the coil of tape on either reel becomes dangerously depleted.

In order to manually raise and lower the tape sensing arms 254 and 256 and their related circuit making and breaking fingers 266 and 268, an operating shaft 288 is journalled for rocking motion in the block 262. An operating handle 290 is fixed to the forward end of the shaft 288. The rear end of the shaft 288 has attached thereto a cam plate 292 to which is pivoted one end of a link 294. The other end of the link 294 is pivoted to the finger 278 so that rocking movement of the shaft 288 will be imparted to the finger 278 and thereby to the gear 272. The gears 270 and 272 being in mesh with each other will transmit operating torque from the gear 272 to the gear 270 and thereby to the other finger 276.

It will be seen from the foregoing description, with particular reference to FIG. 23 of the drawings, that a mechanism has been provided wherein manual rotation of the handle 290 will cause rotation of the gears 270 and 272 with the consequent rocking movement of the fingers 276 and 278. When the handle 290 is rocked to a vertical position, and if the tape sensing arms 254, 256 and the circuit making and breaking fingers 266 and 268, or either of them, are in a lower position, such movement of the handle will be effective to rotate the shafts 258 and 260 and thereby elevate the tape sensing arms 254—256 and the circuit making and breaking fingers 266 and 268.

In lieu of the springs 234 used in the previously described form of the mechanism for imparting stability to the assembly in its open position, there has been provided in the modified form a spring-pressed detent 296 which is adapted to engage a recess 298 in a hub 300 fixed to the shaft 288.

In this modified form of the mechanism the cam plate 292 operates both as an effective stop and as an operator for the thread handle switch THC. The thread handle switch THC (FIG. 21) is so positioned that the edge of the cam plate 292 that is adjacent its junction with the link 294 comes into contact with the thread handle switch to close the same. The cam plate 292 has a shoulder portion 302 which limits the rocking movement of the shaft 288 in one direction by engagement with a stop pin 304 which projects from the rear face of the mounting block 262. Rocking movement of the shaft 288 in the opposite direction is limited by engagement between the upper edge of the cam plate 292 and the hub portion of the finger 278.

It will be observed that the modified form of the tape sensing mechanism embodies no mechanical connection for the tape head cover. This is due to the fact that it is contemplated to use the modified form of the tape sensing assembly with a tape head which is bodily slidable in a vertical path in the face plate of the machine, and which is under the control of a solenoid which may be impulsed in any suitable fashion whenever it is desirable to drop the tape reading head from its normal tape reading position.

Figures 24, 25, 26:
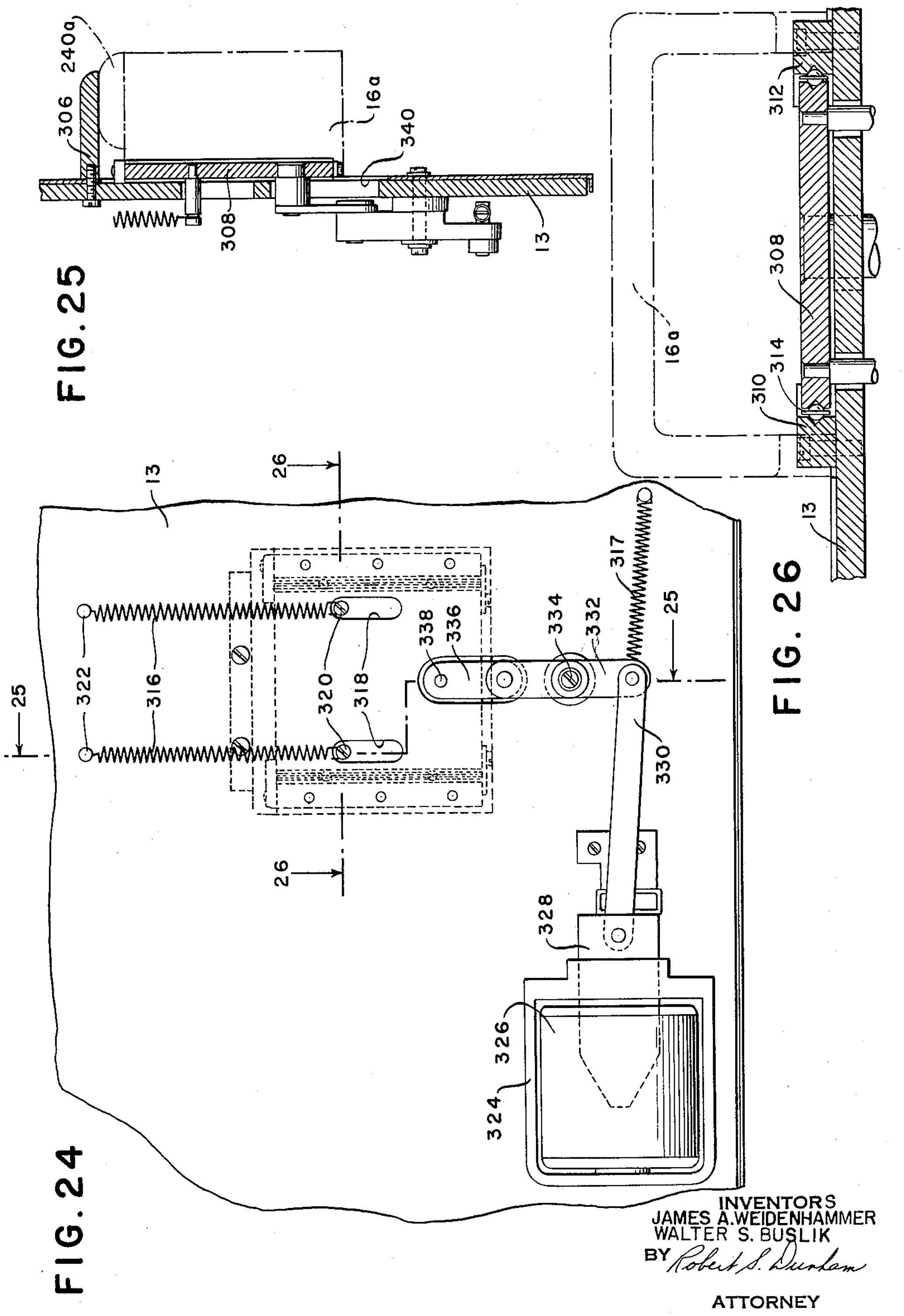
FIG. 24 is an elevational view taken from the back of the device illustrating modified mechanism for causing relative separation between a tape reading head and its cover.
FIG. 25 is a cross-sectional view on line 25—25 of FIG. 24.
FIG. 26 is a transverse cross-sectional view on line 26—26 of FIG. 24.

FIGS. 24, 25 and 26 of the drawings illustrate the structure of a modified form of tape head 16*a*. Herein the tape head has a cover 240*a* supported on a plate 306 which projects forwardly from the face panel 13 of the machine. It is contemplated in this structure that the tape head 16*a* be dropped away from its cover 240*a* rather than separation of the cover from the reading head as in that form shown in FIG. 18 of the drawings.

To secure this function, the tape head 16*a* is secured to a base plate 308 which is mounted for sliding movement on the face panel 13 of the machine between a pair of guides 310 and 312, the base plate 308 being mounted in the guides 310 and 312 by means of anti-friction bearings 314.

The base plate 308 and consequently the tape head 16*a* is held in its upper or operative position by means of a pair of coil springs 316. It may be noted that extending rearwardly from the base plate 308 and through a pair of slots 318 in the face panel of the machine are a pair of studs 320 to which one end of the coil springs 316 are attached, the other ends of the coil springs 316 being fixed to studs 322 projecting rearwardly from the face panel of the machine. It will be seen, therefore, that while the base plate 308 is adapted for movement in a vertical path within the guides 310 and 312, the same is normally held in its upper position where it is in juxtaposition to the cover 240*a* under the influence of the coil springs 316.

Whenever it becomes necessary to drop the tape head 16*a* away from its cover 240*a*, as may be the case when tapes are changed, there has been provided in this form of the mechanism an operating solenoid 324 comprising a coil 326 and a core 328. The outer end of the core 328 has pivoted thereto a link 330 which at its other end is pivoted to a rocking lever 332. The rocking lever is mounted midway between its ends on a pivot stud 334 so that whenever the coil 325 of the solenoid is energized and its core is pulled into the coil, the upper end of the rocking lever 332 will swing in an arc. This motion is utilized to pull down the base plate 308 against the tension of the springs 316 by a connection between the upper end of the rocking lever 332 and a link 336 which is pivoted to a stub shaft 338 fixed to the base plate 308 and extending rearwardly therefrom through a slot 340 in the face panel of the machine.

It follows from what has been said in connection with the structure shown in FIGS. 24 through 26 that whenever the coil 326 of the solenoid is energized, its core 328 will be attracted and the linkage system comprising link 330, rocking lever 332, and link 336 will operate to pull the base plate 308 and its associated tape head 16*a* downwardly and the same will be held in such position so long as the solenoid 324 remains energized. Upon deenergization of the solenoid 324, the coil springs 316 with the aid of a spring 317 will return the base plate 308 and its associated tape head 16*a* to its upper or operative position.

Figure 29:
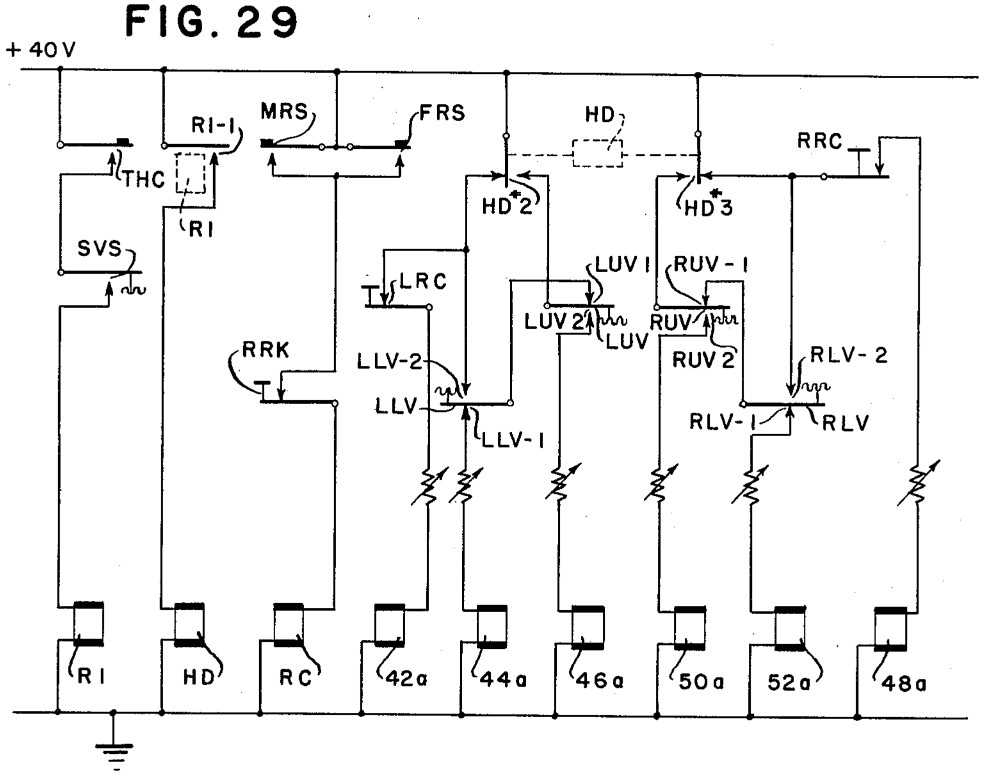
FIG. 29 is a diagram of the electrical control circuit by which rotation of the tape reels is controlled.

The mechanism is put into operation by closure of the line switch LS (FIG. 30) which supplies 115 volt alternating current to the vacuum pump motor VPM. The same circuit includes transformers T (only diagrammatically indicated) from which are derived the 40 volt power supply and the high voltage power supply. Most of the relays, such as those shown in FIG. 29, are connected across the 40 volt power supply line, while the high voltage supply provides the various plate voltages, bias voltages, etc. required by the several electronic units.

As soon as voltage appears on the +40 volt line, the run relay R1 (FIG. 29) is energized through the thread handle contact THC and the safety vacuum switch contact SVS. If there is a tape loop in the control columns 24 and 26, thus forming an air seal between the upper and lower vacuum switches, and if the vacuum motor VPM is operating, the safety vacuum switch SVS in the header 108 (FIG. 1) will be closed by the vacuum built up in the header 108 by the vacuum pump. If the tape sensing arm operating handles 208 or 290 are in a horizontal position, the thread handle contact THC will be closed.

When the relay R1 is energized, its associated point R1–1 closes, thereby energizing a heavy duty relay HD. Energization of the heavy duty relay HD causes its HD–1 point (FIG. 30) to close and its HD–2 and HD–3 points (FIG. 29) to transfer.

Figure 30:
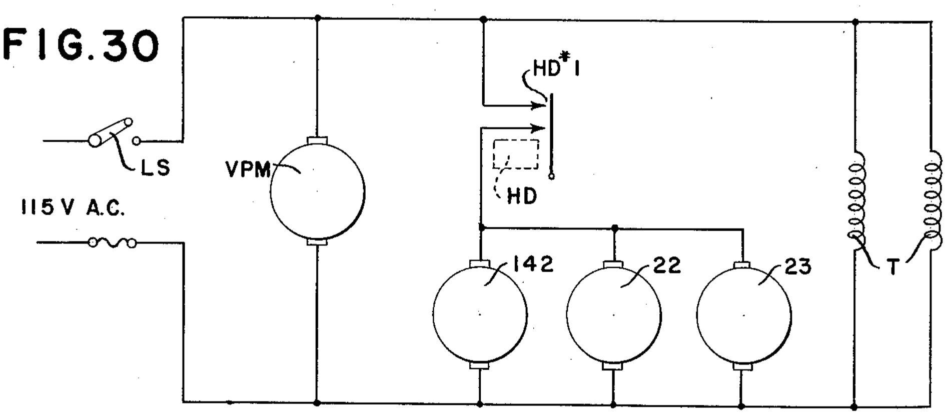
FIG. 30 is a diagram of the motor control and power supply circuit.

By reference to FIG. 30 of the drawings, it will be seen that closure of the HD–1 point closes the circuit of the capstan motor 142 as well as the circuit of the two reel motors 22 and 23.

Figure 28:
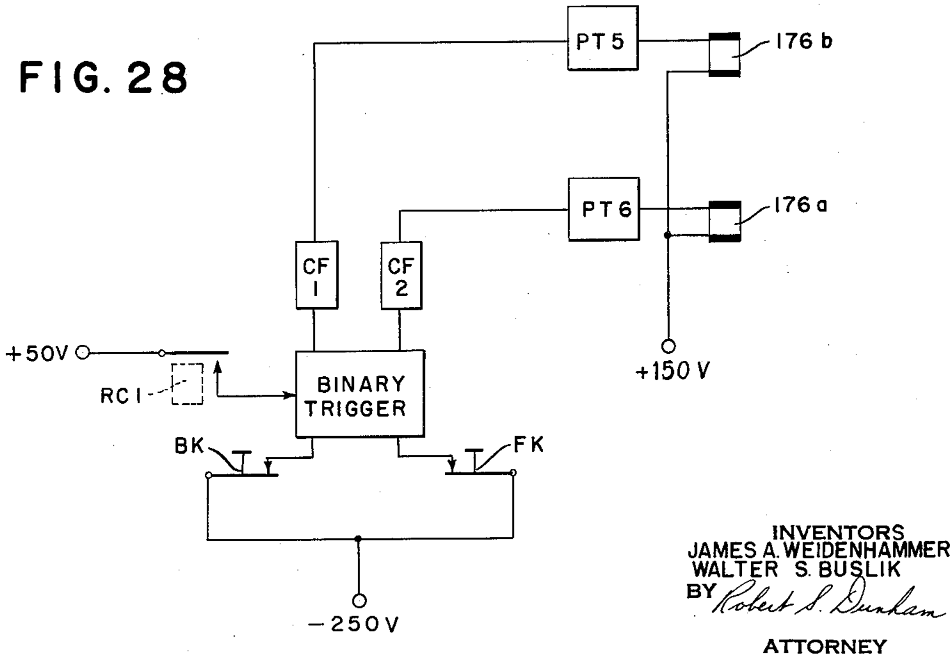
FIG. 28 is a diagram of the electrical control circuit for biasing the tape feed mechanism into forward or reverse feed position.

If it is desired to feed tape from the file reel 10 to the machine reel 18, a forward key FK (FIG. 28) is pressed to open its contact, or if reverse feed from the machine reel 18 to the file reel 10 is required, a backward key BK is depressed to open its contact. Depression of the forward key FK, for example, removes the −250 volt bias supply from the right side of a binary trigger. As a result, the right side of the trigger is rendered conductive, while the left side is rendered non-conductive. With the left side of the trigger being non-conductive, its plate voltage is high. Thus the voltage on the tube side of a cathode resistor of an associated cathode follower CF1 is high and the grid of a connected power tube PT5 is high. With the grid of the power tube PT5 being high, the power tube PT5 conducts heavily and the forward control magnet 176*b* is energized. This will condition the tape moving idler pulley 34 for driving engagement with the forward drive capstan 30.

Figure 27:
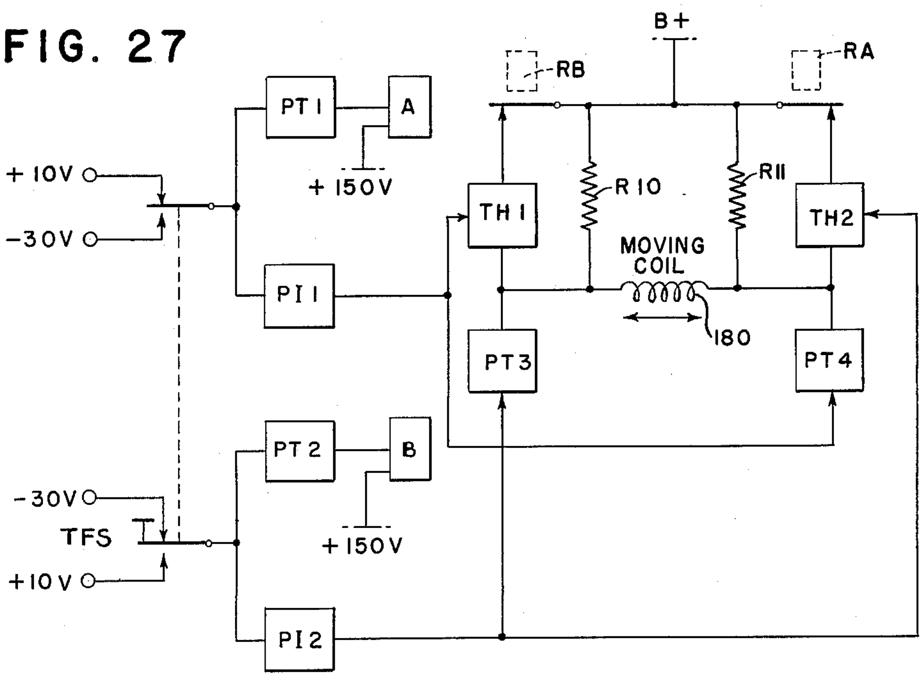
FIG. 27 is a diagram of the electrical control circuit for controlling tape feed through the tape reading head.

Thereafter actual tape feeding in a forward direction is started by depressing a tape feed control switch TFS (FIG. 27). Transferring of this switch applies −30 volts to the grids of a power tube PT1 and a power inverter PI1, while +10 volts are applied to a power tube PT2 and a power inverter PI2. Power tube PT2 and power inverter PI2 are thus rendered conductive, while the power tube PT1 and power inverter PI1 are rendered non-conductive. When the power tube PT2 conducts, it energizes the relay B. However, it takes an appreciable time for the relay B to become sufficiently energized to open its RB point. During this interval by which relay point RB opens, the following action takes place. As the power inverter PI1 goes non-conductive, its plate swings positive. This positive swing is applied to the grid of a thyratron TH1 and the grid of a power tube PT4. The thyratron TH1 fires and the power tube PT4 is rendered conductive. The firing of the thyratron TH1 in effect shorts out resistance R10, and with relay point RB still closed at this time a heavy surge of current passes from B+, through the thyratron TH1, through the moving coil 180 and then through the power tube PT4. This surge of current repels the moving coil 180 from the permanent magnet 182, thereby delivering an upward thrust to the rod 188 which projects the moving idler pulley 34 into contact with the forward drive capstan 30 for driving the tape in a forward direction as hereintofore described.

When relay point RB opens, the thyratron TH1 is dropped out. The power tube PT4 then draws a smaller amount of current through the resistance R10 and the moving coil. This smaller amount of current is sufficient to keep the moving coil 180 energized so that the tape continues to feed. The initial surge through the thyratron TH1 is used only to give a rapid starting action to the tape drive linkage.

If the tape feed key TFS is restored to its normal position, the moving coil is energized in a direction to stop tape feed. The rapid stop action is obtained by an initial surge through the thyratron TH2, whereafter the opening of point RA of the relay C cuts the limiting resistor R11 into the plate circiut of the power tube PT3.

In order to obtain a reverse or backward feed motion of the tape, the backward key BK is opened, thereby energizing the relay 176a which will condition the moving idler pulley 32 for engagement with the reverse drive capstan 28 when the moving coil 180 is again energized to cause an upward thrust on the rod 188, thereby bringing the tape feeding mechanism into the position shown in FIG. 12 of the drawings.

During the time that the tape 14 is actually being fed through the tape head 16, it is under the control of the vacuum switches LUV, LLV, RUV and RLV (FIG. 29). As explained heretofore, these switches are sensitive to the vacuum within the columns 24 and 26, and control the brake and clutch mechanism shown in FIGS. 4 and 5 of the drawings.

Whenever the tape reels 10 or 18 are at rest, they are under control of their respective brakes 42 and 48. These brake circuits are energized as soon as power appears on the 40 volt power line and even before the transfer of the heavy duty relay HD. In such case the brake magnet 42a is energized from the +40 volt line through the untransferred HD–2 point (FIG. 29), the closed left reel release contact LRC through the brake magnet 42a and ground. The brake magnet 48a is energized by a circuit from the +40 volt supply line, through the untransferred HD–3 point, through the right reel release contact RRC, the brake magnet 48a and ground.

When the heavy duty relay HD is energized, it transfers its HD–2 and HD–3 points. Thereafter, the energizing circuit for the brake magnets 42a and 48a is through the respective vacuum switch structures. Let it be assumed that the tape loops now occupy a normal, relatively stable position between the vacuum switches LUV and LLV in column 24 and RUV and RLV in column 26. Under these conditions the brake magnet 42a will be energized by current from the +40 volt supply line, through the now transferred point HD–2, through the normally closed point LUV–1 of the upper vacuum switch LUV, through the transferred point LLV–2 of the left lower vacuum switch LLV which is now subject to the rarified atmosphere within the column 24, through the left reel release contact LRC, the brake magnet 42a and ground.

Energization of the brake magnet 48a under these same conditions is effected from the 40 volt power line, through the transferred contact HD–3, the normally closed RUV–1 contact of the right upper vacuum switch RUV, through the transferred point RLV–2 of the right lower vacuum switch RLV (the vacuum switch RLV now being subject to the rarefied atmosphere in the vacuum column 26), through the normally closed right reel release contact RRC, the brake magnet 48a and ground.

Should the tape loop in the vacuum column 24 rise above the left upper vacuum switch LUV, that switch will be subjected to the rarefied atmosphere in the vacuum column 24 with the result that its LUV–1 point will be opened and its LUV–2 point will be closed. The energizing circuit to the brake magnet 42a is broken when the LUV–1 point opens and the circuit to the unreeling clutch magnet 46a is closed. The magnet 46a will be energized from the power line, through the transferred HD–2 point, and the now closed LUV–2 point of the left upper vacuum switch LUV will provide a circuit for the energization of the unreeling clutch magnet 46a.

When the tape loop in the vacuum column 24 drops below the left lower vacuum switch LLV, that switch will be subject to atmospheric pressure on both sides thereof, with the result that its contact LLV–2 will open and its contact LLV–1 will close. The first effect of this operation is to break the circuit for the brake magnet 42a which is through the LLV–2 point of the switch. Thereafter, upon closure of the LLV–1 point of the left lower vacuum switch, a circuit is provided for the reeling clutch magnet 44a, this circuit being from the positive side of the line through the transferred HD–2 point, the normally closed LUV–1 point of the left upper vacuum switch LUV, through the now normally closed point LLV–1 of the left lower vacuum switch LLV to the clutch magnet 44a and to ground.

The function of the vacuum switches RUV and RLV in the vacuum column 26 is precisely the same as that described in connection with the switches in the vacuum column 24. It is believed that the description thereof need not be labored in this specification, since an understanding of the operation should be clear from the specific description given in connection with the vacuum switches in the vacuum column 24. It is suffice to say that as the tape loops in the respective columns rise, the upper vacuum switches LUV and RUV will be subjected to rarefied atmosphere in the column which will cause atmospheric pressure to transfer the points thereof, whereby the unreeling clutch magnets 46a and 50a are energized to supply tape to the vacuum columns. By the same token, when the tape loops drop below the lower vacuum switches LLV and RLV, these switches which have been subjected to vacuum within the respective columns 24 and 26 will transfer their points to establish an energizing circuit for the reeling clutch magnets 44a and 52a. At such times that the reeling or unreeling clutch magnets are deenergized, the circuit is such as pointed out hereinbefore that the brake magnets 42a and 48a are energized to lock the reels 10 and 18 respectively against rotation. It remains to be noted, however, that the reels 10 and 18 may be selectively released from the influence of their brakes by breaking their energizing circuits through the opening of the reel release contact LRC which is provided for the control of the brake magnets 42a or the right reel release contact RRC which is provided for the control of the brake magnet 48a.

As indicated in FIG. 29 of the drawings, the normally open file reel switch FRS and machine reel switch MRS are paralleled and connected into the pick-up circuit of a relay RC. Assuming that the tape is feeding from the file reel to the machine reel, when the file reel is almost empty the file reel switch FRS closes and the relay RC is energized. Energization of the relay RC causes its point RC1 (FIG. 28) to close. Closure of relay point RC1 supplies a positive voltage to the grids of both sides of the binary trigger. This voltage drives the left side of the trigger into a conductive condition, and the trigger assumes its opposite stable position. The turning of the trigger energizes the backward magnet 176a, and as a result the moving idler pulley 32 is brought into driving contact with the reverse drive capstan 28, thereby causing feed of tape in a reverse direction, i.e. from the machine reel back to the file reel. When it is desired to run the tape completely off one reel or the other, the reel run-out key RRK (FIG. 29) is held depressed so that the reversing relay RC cannot be energized.

When it is desired to move either of the reels 10 or 18, related reel release contacts LRC and RRC are opened. The reel release contact LRC is in the circuit of the brake 42, while the reel release contact RRC is in the circuit of the brake 48. Consequently, opening of the contact LRC will deenergize the brake 42, while opening of the contact RRC will deenergize the brake 48. This will permit free manual turning of either of the reels so released.

It should be understood that the present disclosure is for the purpose of illustration only and that this invention includes all modifications and equivalents which fall within the scope of the appended claims.

What is claimed is:

1. A tape feeding machine having a tape processing station, a pair of tape reels, means associated with said reels for driving the same, a substantially closed tape loop receptacle adapted to receive a free tape loop associated with each of said reels, a rotary tape drive capstan located at each end of said processing station adapted to operate on tape loops in said receptacles to drive tape from said loops through said processing station, means for rotating one of said capstans in one direction and the other of said capstans in the opposite direction, a tape moving idler pulley mounted in proximity to each of said tape drive capstans, means for projecting either of said idler pulleys in the direction of contact with its related drive capstan to thereby press a tape therebetween into tape driving contact with the capstan to feed tape through said processing station, and means independent of said idler pulley projecting means under control of the position of a tape loop in said receptacles for controlling said reel driving means to maintian in said receptacles an optimum length of tape to supply tape to said drive capstans without substantial tension.

2. A tape feeding machine having a tape process-processing station, a pair of tape reels, means associated with said reels for driving the same, a substantially closed tape loop receptacle adapted to receive a free tape loop associated with each of said reels, a rotary tape drive capstan located at each end of said processing station adapted to operate on tape loops in said receptacles to drive tape from said loops through said processing station, means for rotating one of said capstans in one direction and the other of said capstans in the opposite direction, a tape moving idler pulley mounted in proximity to each of said tape drive capstans, electromagnetic means for projecting either of said idler pulleys in the direction of contact with its related drive capstan to thereby press a tape therebetween into tape driving contact with the capstan to feed tape through said processing station, and means independent of said electromagnetic means under control of the position of a tape loop in said receptacles for controlling said reel driving means to maintain in said receptacles an optimum length of tape to supply tape to said drive capstans without substantial tension.

3. A tape feeding machine having a tape processing station, a pair of tape reels, means associated with said reels for driving the same, a substantially closed tape loop receptacle adapted to receive a free tape loop associated with each of said reels, means for rarefying the atmosphere in said receptacles, a rotary tape drive capstan located at each end of said processing station adapted to operate on tape loops in said receptacles to drive tape from said loops through said processing station, means for rotating one of said capstans in one direction and the other of said capstans in the opposite direction, a tape moving idler pulley mounted in proximity to each of said tape drive capstans, electromagnetic means for projecting either of said idler pulleys in the direction of contact with its related drive capstan to thereby press a tape therebetween into tape driving contact with the capsan to feed tape through said processing station, and pressure responsive means independent of said electromagnetic means under control of the position of a tape loop in said receptacles for controlling said reel driving means to maintain in said receptacles an optimum length of tape to supply tape to said drive capstans without substantial tension.

4. In a machine for reeling, unreeling and feeding tape, a pair of tape reels, means for driving each of said reels in either tape reeling or tape unreeling direction comprising respectively a forward and reverse drive device associated with each tape reel, means adapted for control by a tape running between said reels for rendering operative said driving means to drive an associated tape reel in a selected forward or reverse direction, a tape processing station, means for driving a tape through said tape processing station in either of two directions, means independent of said reel driving means for conditioning said tape driving means for driving a tape running between said reels through said processing station in either of two directions, a tape chamber located between each of said reels and said processing station each adapted to receive a loop of tape therein, and means connected to said chembers for rarefying the atmosphere therein such that tape loops therein are maintained in extended position by the difference in air pressure on opposite faces thereof.

5. In a machine for reeling, unreeling and feeding tape, a pair of tape reels, means for driving each of said reels in either tape reeling or tape unreeling direction comprising respectively a forward and reverse drive device associated with each tape reel, vacuum responsive means adapted for control by a tape running between said reels for rendering operative said driving means to control an associated tape reel, a tape processing station, means for driving a tape through said tape processing station in either of two directions, and means independent of said reel driving means for conditioning said tape driving means for driving a tape running between said reels through said processing station in either of two directions.

6. In a machine for reeling, unreeling and feeding tape, a pair of tape reels, means for driving each of said reels in either tape reeling or tape unreeling direction comprising respectively a forward and reverse drive device associated with each tape reel, means adapted for control by a tape running between said reels for selectively rendering operative said driving means to drive an associated tape reel in a selected forward or reverse direction, a tape processing station, means for driving a tape through said tape processing station in either of two directions, and electromagnetic means independent of said reel driving means for conditioning said tape driving means for driving a tape running between said reels through said processing station in either of two directions.

7. In a machine for reeling, unreeling and feeding tape, a pair of tape reels, means for driving each of said reels in either tape reeling or tape unreeling direction comprising respectively a forward and reverse drive device associated with each tape reel, vacuum means adapted for control by a tape running between said reels for selectively rendering operative said driving means to drive an associated tape reel in a selected forward or reverse direction, a tape processing station, means for driving a tape through said tape processing station in either of two directions, and electromagnetic means independent of said reel driving means for conditioning said tape driving means for driving a tape running between said reels through said processing station in either of two directions.

8. A tape feeding machine having a tape processing station, a pair of tape reels mounted for rotation in a vertical plane, means associated with each of said reels for rotating the same, a tape loop receptacle below each of said reels for receiving a free-hanging tape loop, tape transport mechanism including a rotary tape drive capstan located at each end of said processing station adapted to operate on tape loops in said receptacles to transport tape from said loops through said processing station, means for rotating one of said capstans in one direction and the other of said capstans in the opposite direction, means for selectively engaging said capstans and a tape into driving relation with each other to feed tape through said processing station, and means independent of said tape transport mechanism under control of the position of a tape loop in said receptacles for controlling the reel driving means of an associated tape reel to maintain in said receptacles an optimum length of tape to supply tape to said drive capstans without substantial tension, said last-named means being physically independent of said tape loops.

9. A tape feeding machine comprising a pair of tape reels mounted for rotation in a vertical plane, means associated with each of said reels for rotating the same, a tape loop receptacle below each of said reels for receiving a free-hanging tape loop, a tape processing station between said reels, a rotary tape drive capstan located at each end of said processing station adapted to operate on tape loops in said receptacles to transport tape from said loops through said processing station, means for continuously rotating one of said capstans in one direction and the other of said capstans in the opposite direction, means for selectively engaging said capstans and a tape into driving relation with each other to feed tape through said processing station, and means independent of said selective engaging means under control of the position of a tape loop in said receptacles for controlling the reel driving means of an associated tape reel to maintain in said receptacles an optimum length of tape to supply tape to said drive capstans without substantial tension, said last-named means being physically independent of said tape loops.

10. A tape feeding machine having a tape processing station, a pair of rotary tape reels, means associated with each of said reels for rotating the same, a receptacle below each of said reels for receiving a free-hanging tape loop, tape transport mechanism including a rotary tape drive capstan located at each end of said processing station adapted to operate on tape loops in said receptacles to transport tape from said free-hanging loops through said processing station, means for rotating one of said capstans in one direction and the other of said capstans in the opposite direction, means for selectively engaging said capstans and a tape into driving relation with each other to feed tape through said processing station, means independent of said tape transport mechanism under control of the position of a tape loop in said receptacles for controlling the reel driving means of an associated tape reel to maintain in said receptacles an optimum length of tape to supply tape to said drive capstans without substantial tension, said last-named means being physically independent of said tape loops, means for rendering ineffective a tape engaged capstan to transport tape, and tape braking means located between said receptacle and said tape processing station effective to stop the movement of tape therethrough when said capstans are rendered ineffective to transport tape.

11. A tape feeding machine having a tape processing station, a pair of rotary tape reels, means associated with each of said reels for selectively rotating the same in ether direction, a receptacle below each of said reels for receiving a free-hanging tape loop, tape transport mechanism including a rotary tape drive capstan located at each end of said processing station adapted to operate on tape loops in said receptacles to transport tape from said free-hanging loops through said processing station, means for continuously rotating one of said capstans in one direction and the other of said capstans in the opposite direction, means for selectively engaging said capstans and a tape into driving relation with each other to feed tape through said processing station, means independent of said selective engaging means under control of the position of a tape loop in said receptacles for controlling the reel driving means of an associated tape reel to maintain in said receptacles an optimum length of tape to supply tape to said drive capstans without substantial tension, said last-named means being physically independent of said tape loops, means for rendering ineffective a tape engaging capstan to transport tape, and tape braking means located between said receptacles and said tape processing station effective to stop movement of tape therethrough when said capstans are rendered ineffective to transport tape.

12. A magnetic tape feeding machine having a tape read-write head, a pair of tape reels mounted in said machine for rotation in a vertical plane, a motor for rotating said reels, a substantially closed tape receptacle associated with each of said reels for receiving therein a free length of tape from said reels, tape transport mechanism including a rotary tape drive capstan located at each end of said tape read-write head adapted to operate on tape from said receptacles to transport tape from said receptacles to said tape read-write head, means for rotating one of said capstans in one direction and the other of said capstans in the opposite direction, means for selectively engaging said capstans and a tape into driving relation with each other to feed tape to said tape read-write head, and means independent of said tape transport mechanism and under control of tape in said receptacles for controlling said reel driving motor to maintain in said receptacles an optimum length of tape to supply tape to said drive capstans without substantial tension.

13. A magnetic tape feeding machine having a tape read-write head, a pair of rotary tape reels, a motor for rotating said reels, a substantially closed tape receptacle associated with each of said reels for receiving therein a free length of tape from said reels, tape transport mechanism including a rotary tape drive capstan located at each end of said read-write head adapted to operate on tape contained in said receptacles to transport tape from said receptacles to said tape read-write head, means for rotating one of said capstans in one direction and the other of said capstans in the opposite direction, means for selectively engaging said capstans and a tape into driving relation with each other to feed tape to said read-write head, means independent of said tape transport mechanism and under control of tape in said receptacles for controlling said reel driving motor to maintain in said receptacles an optimum length of tape to supply tape to said drive capstans without substantial tension, means for disengaging a selected drive capstan from a tape engaged thereby, and tape braking means located between said receptacles and said tape read-write head effective to stop the movement of tape therethrough when said capstans have been disengaged from driving relation to a tape.

14. A tape feeding machine having a tape processing station, a supporting structure, a pair of spaced rotary tape reels mounted in said structure for reeling and unreeling a tape therebetween, means associated with said reels for rotating the same, a tape loop chamber having spaced side walls associated with each of said reels for receiving a tape loop therein, a tape entrance and exit passage in each of said chambers, means for maintaining tape loops in said chambers spaced from said side walls thereof throughout a substantial part of the length of such loops, tape transport mechanism adapted to draw on tape loops in said chambers to transport tape from said loops through said processing station, means independent of said tape transport mechanism under control of the length of a tape loop in said chambers for controlling the reel rotating means of an associated tape reel to maintain in said chambers an optimum length of tape to supply tape to said transport mechanism without substantial tension, and means communicating with said chambers remote from the tape passage thereof for exhausting atmosphere therefrom whereby tape loops therein are maintained in an extended position by the difference in air pressure on opposite faces thereof.

15. A tape feeding machine having a tape processing station, a supporting structure, a pair of spaced rotary tape reels mounted in said structure for reeling and unreeling a tape therebetween, means associated with said reels for rotating the same, a tape loop chamber associated with each of said reels for receiving a tape loop therein, a tape entrance and exit passage in each of said chambers, tape transport mechanism adapted to draw on tape loops in said chambers to transport tape from said loops through said processing station, means independent of said tape transport mechanism under control of the length of a tape loop in said chambers for controlling the reel rotating means of an associated tape reel to maintain in said chambers an optimum length of tape to supply tape to said transport mechanism without substantial tension, and means communicating with said chambers remote from the tape passage thereof for exhausting atmosphere therefrom whereby tape loops therein are maintained in an extended position by the difference in air pressure on opposite faces thereof.

16. A tape feeding machine having a tape processing station, a supporting structure, a pair of spaced rotary tape reels mounted in said structure for reeling and unreeling a tape therebetween, means associated with said reels for rotating the same, a tape loop chamber having spaced side walls associated with each of said reels for receiving a tape loop therein, a tape entrance and exit passage in each of said chambers, tape guides associated with each of said tape passages for maintaining tape loops in said chambers spaced from said side walls thereof throughout a substantial part of the length of such loops, tape transport mechanism adapted to draw on tape loops in said chambers to transport tape from said loops through said processing station, means independent of said tape transport mechanism for controlling said reel rotating means to maintain in said chambers an optimum length of tape to supply tape to said tape transport mechanism without substantial tension, and means communicating with the end of said chambers remote from the tape passage thereof for exhausting atmosphere therefrom whereby tape loops therein are maintained in an extended position by the difference in air pressure on opposite faces thereof.

17. A tape feeding machine having a tape processing station, a supporting structure, a pair of spaced rotary tape reels mounted in said structure for reeling and unreeling a tape therebetween, means associated with said reels for rotating the same, a tape loop chamber having spaced side walls associated with each of said reels for receiving a tape loop therein, a tape entrance and exit passage at one end of each of said chambers, tape guides associated with said tape passages for maintaining tape loops in said chambers spaced from said side walls thereof throughout a substantial part of the length of such loops, tape transport mechanism adapted to draw on tape loops in said chambers to transport tape from said loops through said processing station, means independent of said tape transport mechanism under control of the length of a tape loop in said chambers for controlling the said reel rotating means of an associated tape reel to maintain in said chambers an optimum length of tape to supply tape to said tape transport mechanism without substantial tension, and means communicating with the end of said chambers remote from the tape passage thereof for exhausting atmosphere therefrom whereby tape loops therein are maintained in an extended position by the difference in air pressure on opposite faces thereof.

18. A tape feeding machine having a tape processing station, a supporting structure, a pair of spaced tape reels mounted in said structure for rotation in a vertical plane and adapted for reeling and unreeling a tape therebetween, means associated with said reels for rotating the same, a vertically disposed tape loop chamber having a pair of spaced side walls below each of said reels for receiving a free tape loop therein, a tape entrance and exit passage at the top of each of said chambers, tape guides associated with each of said tape passages for maintaining tape loops in said chambers spaced from said side walls thereof throughout a substantial part of the length of such loops, tape transport mechanism including a pair of rotary drive capstans adapted to draw on tape loops in said chambers to transport tape from said loops through said processing station, means for rotating said capstans in opposite directions, means independent of said tape transport mechanism and responsive to the length of a tape loop in said chambers for controlling the reel rotating means of an associated tape reel to maintain in said chambers optimum length of tape to supply tape to said drive capstans without substantial tension, and means communicating with the bottom of said chambers for exhausting atmosphere therefrom whereby tape loops therein are maintained in an extended position by the difference in air pressure on opposite faces thereof.

19. A tape feeding machine having a tape processing station, a supporting structure, a pair of rotary tape reels mounted in said structure for reeling and unreeling a tape therebetween, means operatively associated with said reels for rotating the same, a tape loop chamber associated with each of said reels for receiving a tape loop therein, a tape entrance and exit passage in each of said chambers, tape transport mechanism independent of said reel rotating means adapted to draw on tape loops in said chambers to transport tape from said loops to said processing station, and means communicating with said chambers remote from the tape passage thereof for exhausting atmosphere therefrom whereby tape loops therein are maintained in an extended position by the difference in air pressure on opposite faces thereof.

20. A tape feeding machine having a tape processing station, a supporting structure, a rotary tape reel mounted in said structure, means operatively associated with said reel for rotating the same, a tape loop chamber associated with said reel for receiving a tape loop therein, a tape entrance and exit passage in said chamber, a tape transport mechanism adapted to draw on a tape loop in said chamber to transport tape from said loop through said processing station, means independent of said tape transport mechanism under control of a tape loop in said chamber for controlling the reel rotating means to maintain in said chamber an optimum length of tape to supply tape to said transport mechanism without substantial tension, and means communicating with said chamber remote from the tape passage thereof for exhausting atmosphere therefrom whereby a tape loop therein is maintained in an extended position by the difference in air pressure on opposite faces thereof.

21. In a tape feed machine having a tape processing station, a tape storage means, a tape loop chamber associated with said storage means for receiving a tape loop therein, means for feeding tape from said tape storage means to said tape loop chamber, a tape transport mechanism independent of said tape feeding means adapted to draw on a tape loop in said chamber to transport tape between said chamber and said tape processing station, and means communicating with said tape loop chamber for exhausting atmosphere therefrom, a moving tape extending into said tape loop chamber being adapted to seal said chamber whereby a tape loop is formed in said chamber by the difference in air pressure on opposite faces of a tape therein.

22. In a reeling system for a tape member, a tape processing station, driving means for driving tape through said processing station, a first and second tape storage means, means for feeding tape from said first tape storage means and for reeling tape in said second tape storage means, a first and second tape accumulating receptacle associated respectively with said first and second tape storage means for receiving and substantially enclosing a loop of tape between each of said tape storage means and said tape driving means, means positioned in cooperative association with each of said tape accumulating receptacles and physically independent of tape therein for determining the amount of tape in said two tape accumulating receptacles, and means responsive to said determining means and independent of said tape driving means for controlling movement of tape between said tape accumulating receptacles and their respectively associated tape storage means whereby a substantially tensionless loop of tape is maintained in said tape accumulating receptacles and said tape driving means is isolated from the tape storage means by such loops.

23. In a tape reeling system, a tape processing station, a first and second tape reel, means for selectively rotating said reels for reeling and unreeling tape, a first and second tape loop receptacle associated respectively with said first and second tape reel for receiving a loop of tape from its respectively associated tape reel, tape driving means between said tape loop receptacles for driving tape through said processing station, means positioned in cooperative association with each of said tape loop receptacles and physically independent of tape therein for sensing the length of a tape loop in each of said tape loop receptacles, and means responsive to said sensing means and independent of said tape driving means for controlling said reel rotating means to feed tape between said tape loop receptacles and their respectively associated tape reels such that a loop of tape is maintained in said tape loop receptacles and said tape driving means is isolated from said tape reels by such loops.

24. In a tape reeling system, a first and second tape reel for receiving a supply of tape coiled thereon, means for selectively rotating said reels for reeling and unreeling tape, a substantially enclosed first and second tape loop receptacle in fixed association respectively with said first and second tape reel for receiving a loop of tape connected to its respectively associated tape reel, a pair of tape driving capstans between said tape loop receptacles, a tape processing station between said tape driving capstans, means independent of said reel rotating means for activating said capstans for driving tape through said processing station, means positioned in cooperative association with each of said tape loop receptacles and physically independent of tape therein for sensing the length of a tape loop in each of said tape loop receptacles, and means responsive to said sensing means for controlling said reel rotating means to feed tape between said tape loop receptacles and their respectively associated tape reels such that a substantially tensionless loop of free tape is maintained in said tape loop receptacles and said tape driving capstans are isolated from said reels by such loops.

25. In a tape feeding machine, tape supply means, a tape loop chamber associated with said tape supply means for receiving and substantially enclosing a tape loop therein, tape driving mechanism adapted to draw on a tape loop in said chamber to withdraw varying lengths of tape from a loop thereof within said chamber, a tape from said tape supply means looped within said tape loop chamber adapted to substantially seal said chamber transversely thereof, means independent of said tape driving mechanism for delivering tape from said supply means to said chamber whereby a varying amount of slack tape is present in said chamber, and means for maintaining differential atmospheric pressures on opposite faces of said tape within said chamber whereby said tape is maintained under tension by forming within said chamber a tape loop that varies in size according to the difference between the length of tape delivered to said chamber and the length of tape withdrawn therefrom.

26. In a tape feeding machine, tape supply means, a tape loop chamber associated with said tape supply means for receiving and substantially enclosing a tape loop therein, tape driving mechanism adapted to draw on a tape loop in said chamber to withdraw varying lengths of tape from a loop thereof within said chamber, a tape from said tape supply means looped within said tape loop chamber adapted to substantially seal said chamber transversely thereof, means independent of said tape driving mechanism for delivering tape from said supply means to said chamber whereby a varying amount of slack tape is present in said chamber, and vacuum means connected to said chamber to maintain differential atmospheric pressures on opposite faces of said tape within said chamber whereby said tape is maintained under tension by forming within said chamber a tape loop that varies in size according to the difference between the length of tape delivered to said chamber and the length of tape withdrawn therefrom.

References Cited in the file of this patent

UNITED STATES PATENTS

| | | |
|---|---|---|
| 1,439,058 | Baeseler | Dec. 19, 1922 |
| 1,749,060 | Beaumont | Mar. 4, 1930 |
| 1,944,173 | Eitzen | Jan. 23, 1934 |
| 2,071,192 | Younts | Feb. 16, 1937 |
| 2,097,142 | Borton | Oct. 26, 1937 |
| 2,153,113 | Winter | Apr. 14, 1939 |
| 2,180,793 | Carlson | Nov. 21, 1939 |
| 2,221,543 | Johannessen | Nov. 12, 1940 |
| 2,235,029 | Levinson | Mar. 18, 1941 |
| 2,304,913 | Herzig | Dec. 15, 1942 |
| 2,364,556 | Somers | Dec. 5, 1944 |
| 2,365,691 | Fodor | Dec. 26, 1944 |
| 2,377,323 | Carlson | June 5, 1945 |
| 2,389,047 | Heinz | Nov. 13, 1945 |
| 2,430,538 | Somers | Nov. 11, 1947 |
| 2,590,665 | Williams | Mar. 25, 1952 |
| 2,597,133 | Snyder | May 20, 1952 |
| 2,609,998 | Sear | Sept. 9, 1952 |
| 2,708,554 | Welsh et al. | May 17, 1955 |
| 2,730,309 | Baer | Jan. 10, 1956 |

UNITED STATES PATENT OFFICE

CERTIFICATE OF CORRECTION

Patent No. 3,057,568 October 9, 1962

James A. Weidenhammer et al.

It is hereby certified that error appears in the above numbered patent requiring correction and that the said Letters Patent should read as corrected below.

Column 4, line 63, for "my" read -- by --; column 6, lines 35 and 36, for "clean-cut" read -- clean-out --; column 13, line 63, for "325" read -- 326 --; column 15, line 23, for "circiut" read -- circuit --; column 18, lines 22 and 23, for "chembers" read -- chambers --; column 19, line 54, for "receptacle" read -- receptacles --; line 60, for "ether" read -- either --.

Signed and sealed this 23rd day of April 1963.

(SEAL)
Attest:

ERNEST W. SWIDER
Attesting Officer

DAVID L. LADD
Commissioner of Patents